Sept. 7, 1965  G. M. DE LALIO  3,204,486
INFINITELY VARIABLE POWER TRANSMISSION
Filed March 6, 1963  10 Sheets-Sheet 1

INVENTOR.
George M. DeLalio
BY
ATTORNEYS

INVENTOR.
George M. DeLalio
BY
Shoemaker & Mattau
ATTORNEYS

Sept. 7, 1965 G. M. DE LALIO 3,204,486
INFINITELY VARIABLE POWER TRANSMISSION
Filed March 6, 1963 10 Sheets-Sheet 3

INVENTOR.
George M. DeLalio
BY
ATTORNEYS

Sept. 7, 1965         G. M. DE LALIO         3,204,486
INFINITELY VARIABLE POWER TRANSMISSION
Filed March 6, 1963                          10 Sheets-Sheet 4
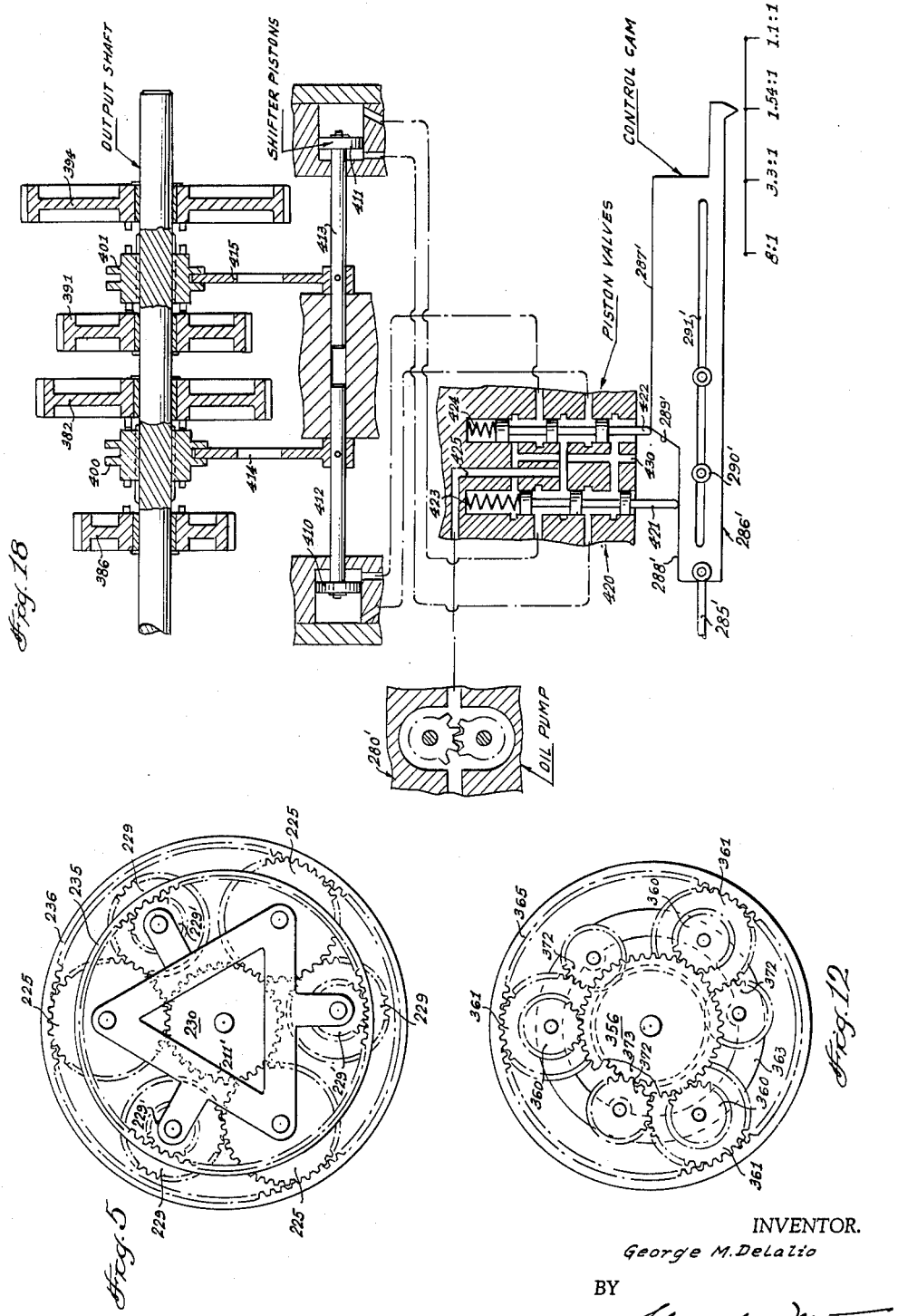
INVENTOR.
George M. DeLalio
BY
ATTORNEYS

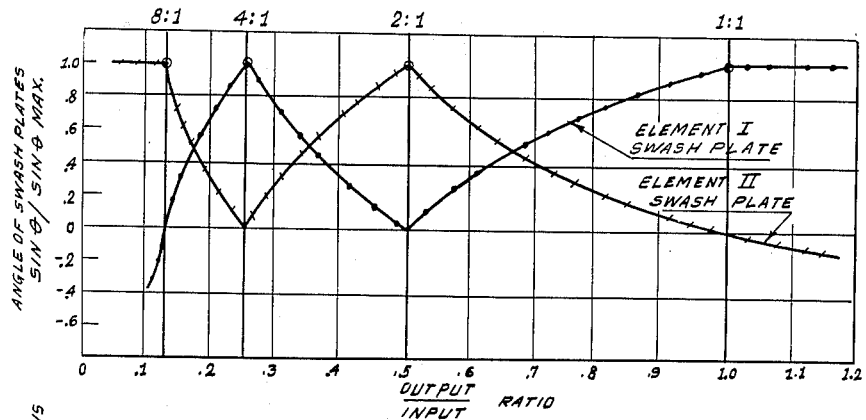
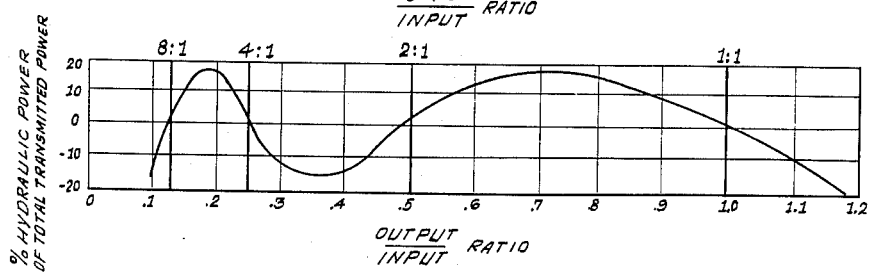
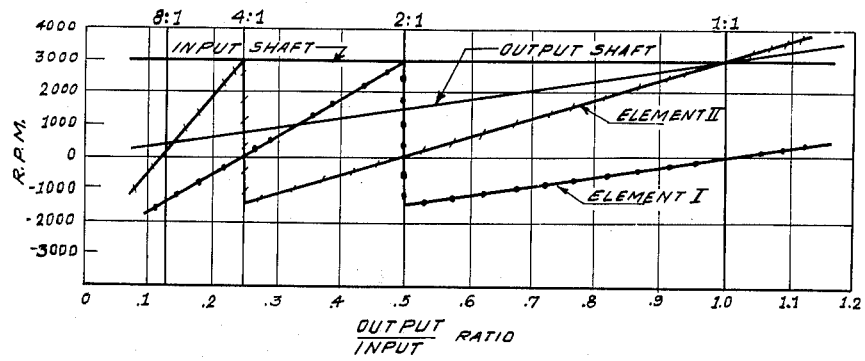

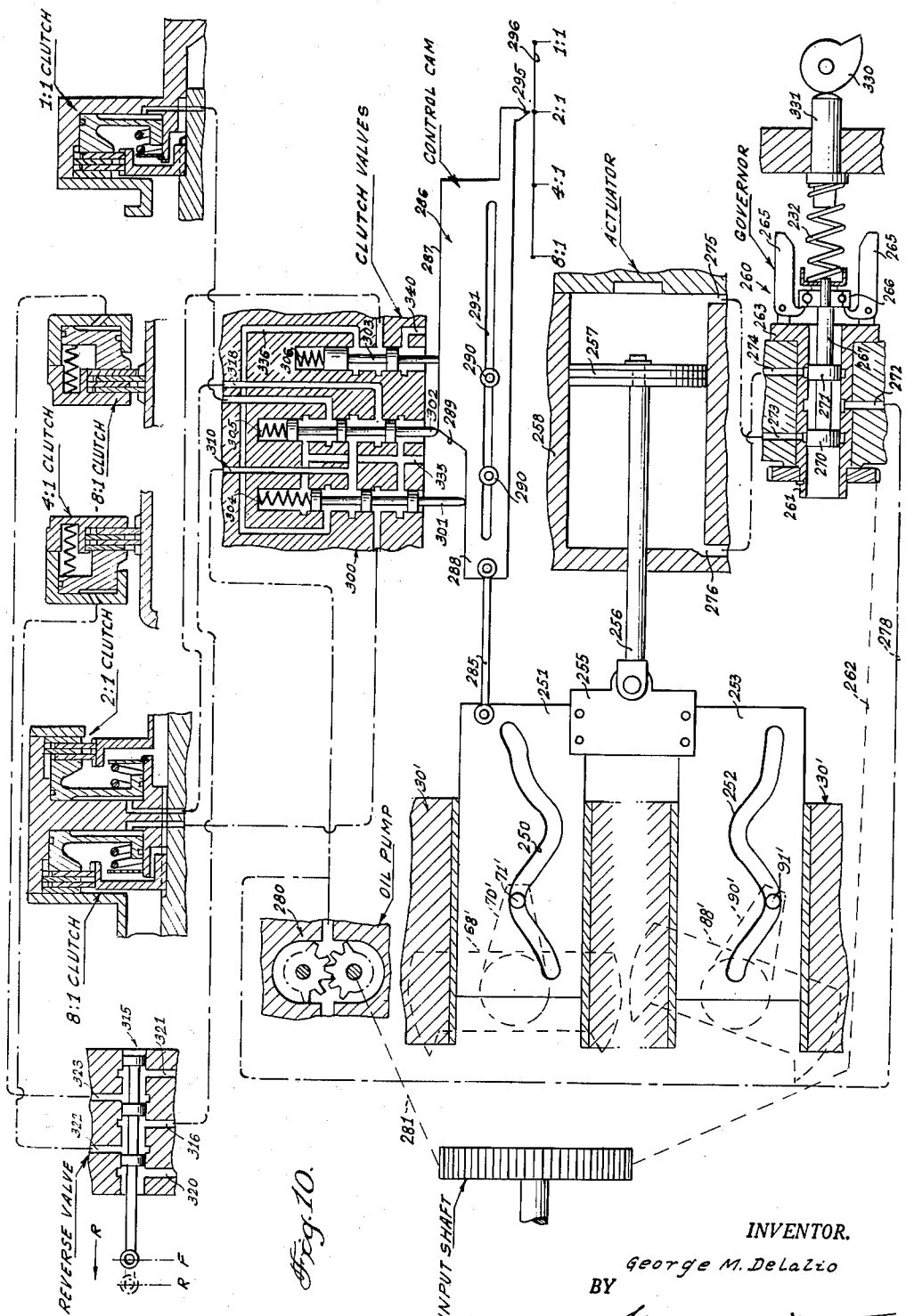

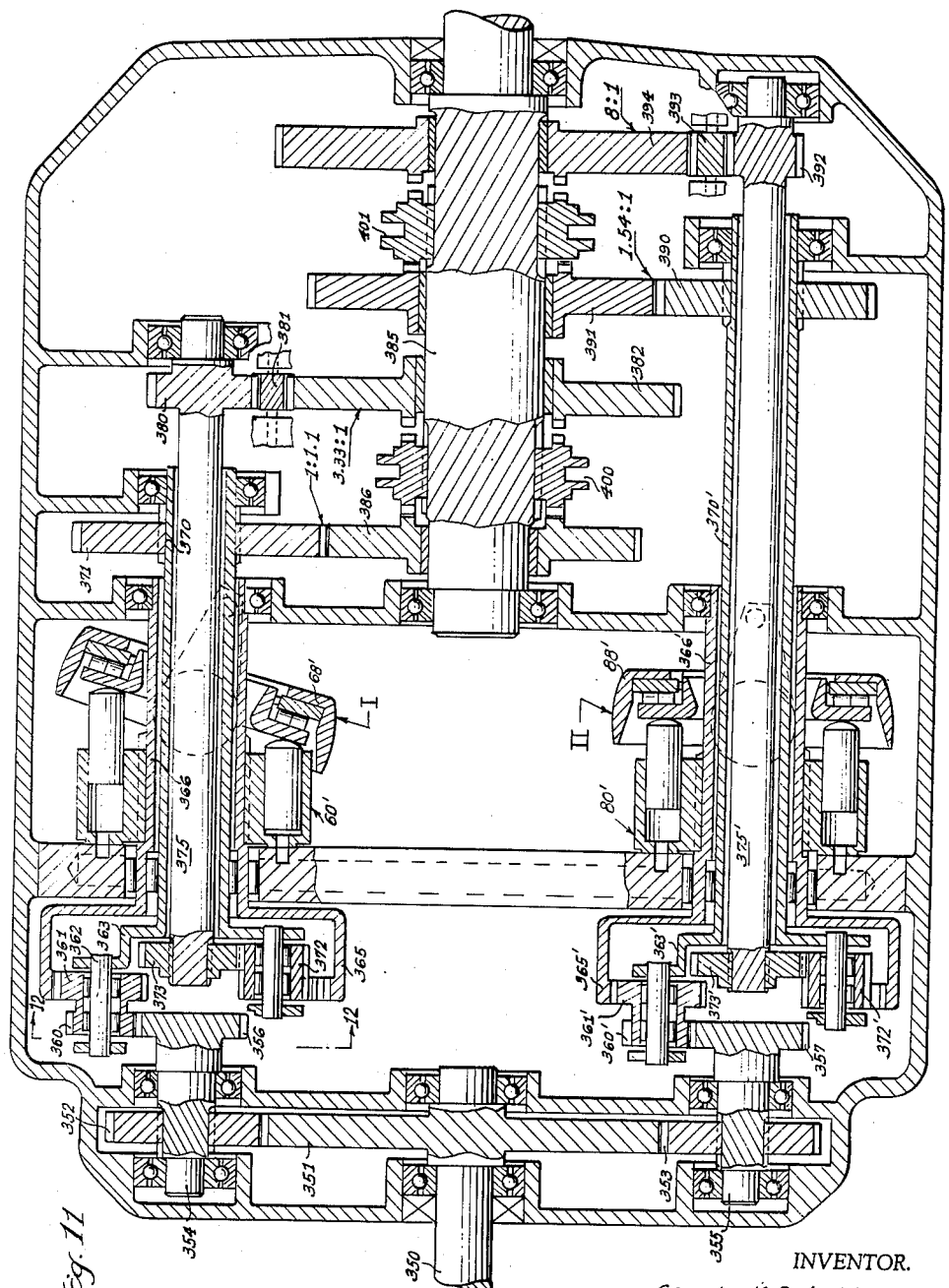

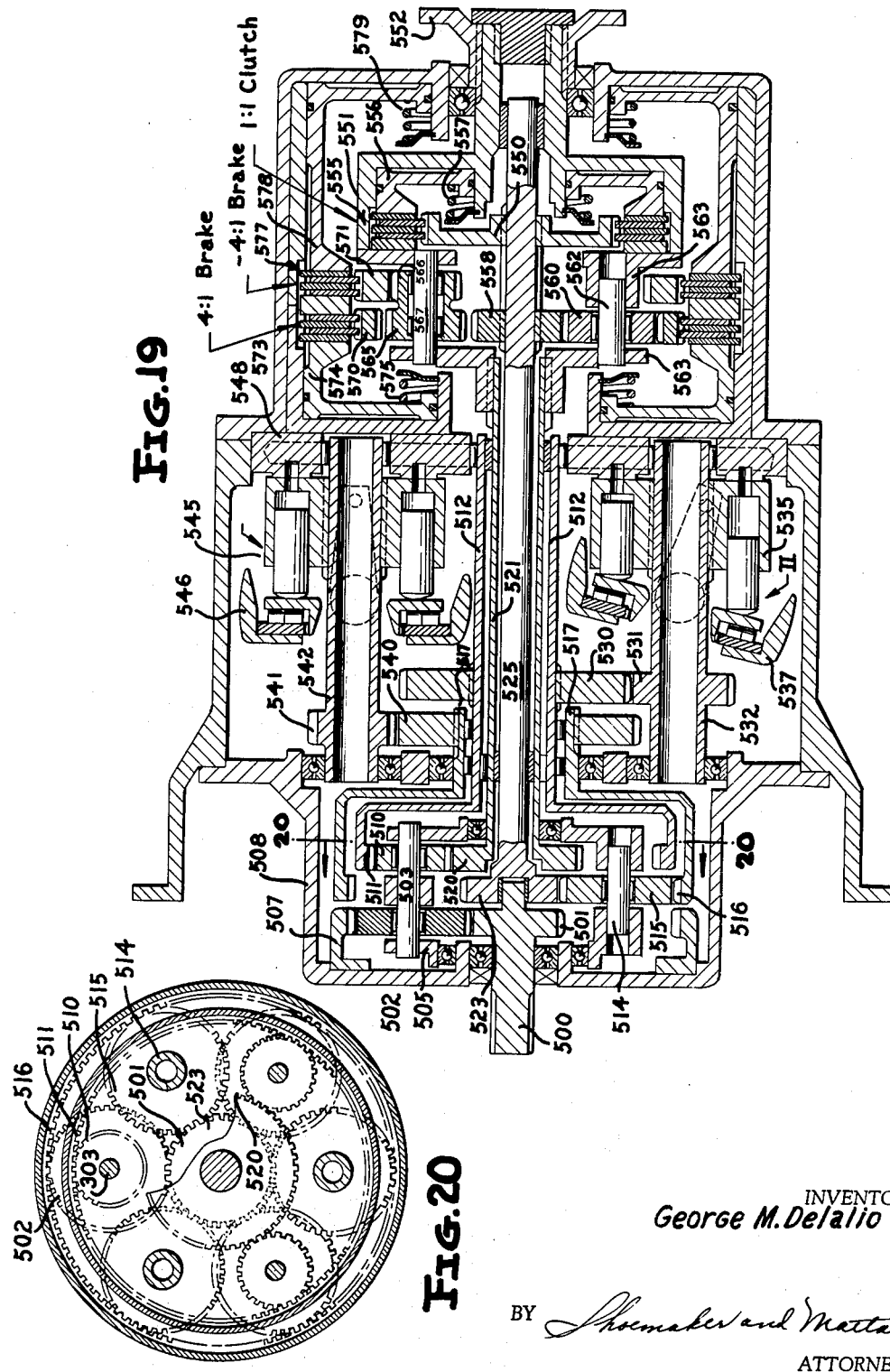

United States Patent Office 3,204,486
Patented Sept. 7, 1965

3,204,486
INFINITELY VARIABLE POWER TRANSMISSION
George M. De Lalio, Kent, Ohio
(Capel Drive, R.D. 6, Huntington, N.Y.)
Filed Mar. 6, 1963, Ser. No. 264,011
18 Claims. (Cl. 74—687)

The present invention relates to a new and novel infinitely variable power transmission, and more particularly to a transmission which is adapted to provide an infinitely variable drive ratio between an input and an output means over a wide speed range and at full power.

The present application is a continuation-in-part of copending application Ser. No. 60,595, filed October 5, 1960, now abandoned.

Infinitely variable power transmissions of the type according to the present invention are particularly desirable in certain applications such as is used in automobiles and the like, and even more particularly in certain commercial applications such as in bus and truck transmissions as well as in transmissions utilized with certain types of power equipment such as earth movers and the like.

The present invention employs a hydraulic power transmission means of the hydrostatic type wherein the hydraulic transmission means includes separate pump and motor units, each of which comprises a plurality of pistons which reciprocate within cylinders in a well-known manner, the travel of the pistons being controlled by conventional swash plate means.

Many infinitely variable driving arrangements have been previously designed in the art employing hydrostatic type transmissions, but these have proved unsatisfactory due to the fact that the efficiency of this type of hydraulic transmission is far below that of mechanical type transmissions, and also because of the fact that when large loads or torques are encountered, the size and bulk of the hydrostatic transmission elements becomes prohibitive from a cost standpoint.

Prior art hydrostatic type transmissions for similar applications in trucks and buses and the like rely solely on the shifting of the swash plate control means to obtain ratio variations. With this type of arrangement, in order to obtain a wide range of speed ratios, the hydrostatic elements must either transmit a relatively high percentage of the transmitted power, or are subjected to very high torque reactions. Of course, in either case, the size of the hydrostatic elements must be substantially increased.

It is accordingly a main objective of the present invention to provide an infinitely variable power transmission employing a hydrostatic power transmission means wherein the amount of power transmitted through the hydrostatic power means is maintained at a minimum while the major portion of the power is transmitted through a differential mechanical driving connection thereby providing a greater degree of over-all efficiency to the apparatus.

In addition, this high degree of efficiency must be maintained over a wide speed range while the device is operating at full power. In order to accomplish this desired end result, the present invention incorporates a novel construction wherein the transmission operates through a range of input to output speed of approximately 10:1 to 1:1.1, and throughout this range, the hydrostatic power path does not transmit more than 20 percent of the total power at any time; and ordinarily the amount of power transmitted through the hydraulic power transmission means is considerably less than 20 percent. This, of course, represents a major advance over the prior art wherein the transmissions employing hydrostatic power transmission means ordinarily transmit a relatively high percentage of the power directly through the hydrostatic power transmission portion of the apparatus.

One of the basic concepts of the present invention is the utilization of a unique combination wherein the input power is divided into two power paths which are in parallel with one another, the two power paths being in turn coupled to an output means. The two power paths are coupled to the output means through various gears which can be selectively and drivingly connected or disconnected from the output means or driven shaft thereby permitting various gear ratios to be connected in the power chain. In order to change from one gear ratio to another selectively, engageable and disengageable driving connections are employed and these may for example take the form of clutches.

In the combination of the present invention wherein clutch or brake means are employed, it is particularly advantageous to provide a novel arrangement whereby the clutches or brakes may be engaged and disengaged only when under no-load conditions or in other words, when the portions of the driving path to which the output means is coupled are under no-load conditions from the input shaft. That is to say, the clutches or brakes are only engaged and disengaged when the hydrostatic power transmission is adjusted so that no load will be imposed on the clutches or brakes from the input means. The advantages inherent in this arrangement are self-evident since this novel intercooperation reduces the wear on the clutches or brakes such that the life thereof can be considerably extended, and accordingly, reducing the maintenance costs of such an arrangement to a minimum.

A further advantage of the present invention is the fact that the dual power path arrangement permits the various gear ratios to be connected and disconnected without producing any noticeable torque surges or shift points. This, of course, is highly desirable in any type of vehicle employing an automatic transmission and results in a very smooth uniform operation of the transmission when in use. Since a mechanical shifting arrangement is provided in the present invention which permits the changing of the gear ratios between the intermediate driving connections and the output means, the range over which the hydrostatic elements must be relied upon to change the gear ratios through infinite degrees is substantially reduced. Accordingly, smaller size hydrostatic elements may be employed. In addition, the hydraulic pressure transmission means operates at a substantially constant pressure and does not perform any torque multiplication. Accordingly, this also enables the hydraulic transmission components to be of less size and weight thereby producing a more economical construction.

A further advantage of the present invention when employing friction clutches between the intermediate driving connections and the output means of the apparatus is an arrangement whereby when the transmission is operating at a substantially 1:1 driving ratio, the remaining components of the apparatus will be declutched so as to reduce the motoring losses of the hydrostatic elements to a minimum.

In addition, the present invention contemplates a further modification whereby the various gear ratios may be readily connected into the driving chain by means of conventional dog clutches or similar positive type clutch means without the necessity of providing synchronizing devices or conventional friction type clutches which can adapt themselves to differences in speeds of rotation between the two members to be clutched together. This is accomplished by providing an arrangement whereby the elements to be clutched at any particular time are automatically synchronized with one another thereby eliminating the necessity of any means for bringing one of the members up to the speed of the other member.

The present invention employs a basically new concept in that the input means is connected to two intermediate driving connections which provide parallel power paths through the transmission, the two intermediate driving connections in turn being connected with an output means. In each case, the intermediate driving connection is connected with the input means through a planetary gearing. One of the members of each of the planetary gearings is operatively connected with a portion of the hydraulic power transmission means whereby control of the hydraulic power transmission means results in control of the movement of one of the members of each of the planetary gearings. In this manner, the amount of power transmitted through each of the intermediate driving connections may be adjusted through an infinite range, or in other words, all of the power may go through one of the intermediate driving connections or all of the power may go through the other intermediate driving connection or some portion of the power may be transmitted through one intermediate driving connection and the remainder of the power transmitted through the other intermediate driving connection.

The intermediate driving connections are in turn coupled with the output means through a plurality of gears which provide different gear ratios for the over-all transmission. The intermediate driving connections are selectively coupled through these various gears to the output means by means of selectively actuated clutch or brake means or the like.

A control system is also associated with the transmission so as to provide a unique and unusual cooperation between the various components of the transmission. The hydrostatic transmission portion is controlled in a conventional manner, by swash plate means to control the reciprocatory travel of the pistons of the hydrostatic means. The control system of the invention incorporates means for simultaneously controlling the position of the swash plate means as well as the actuation of the various clutch or brake means associated with the apparatus. The control system incorporates a plurality of components which are so interconnected and interrelated with one another that the clutches or brakes associated with either of the intermediate driving connections are only engaged when the swash plate means is so positioned as to provide no power drive from the input means through the particular associated intermediate driving connection. As mentioned previously, this results in the highly advantageous feature that the clutches and brakes are only engaged and disengaged under no-load conditions.

The control system may, of course, be either manually or automatically controlled but is preferably automatic in nature in that it is responsive to the input shaft speed thereby providing a substantially automatic operation of the various components of the transmission for any particular throttle setting as in the case of a vehicle and the like, the input shaft speed, of course, being a function of the load and torque demands placed on the engine of the vehicle.

An object of the present invention is to provide a new and novel infinitely variable power transmission which provides an infinitely variable drive ratio between the input and output means over a wide speed range and at full power.

Another object of the invention is to increase the overall efficiency of the transmission primarily by reducing to a minimum the amount of power which is transmitted through the hydraulic power transmission means during operation of the apparatus.

A further object of the present invention is the provision of an infinitely variable power transmission including shiftable means for providing various gear ratios between the output means and intermediate drive connections of the transmission wherein the shiftable means are shifted under no-load or no-power conditions so as to eliminate torque surges or noticeable shift points in the output driven shaft and further to minimize wear on the shiftable means.

Still another object of the invention is to provide an infinitely variable power transmission including a hydraulic power transmission means which operates at a substantially constant pressure and which eliminates torque multiplication thereby resulting in smaller and lighter construction which decreases the hydraulic transmission losses to further improve efficiency and also to provide greater bearing life of the hydraulic elements. It is important to obtain high efficiency that not only the hydraulic horsepower be reduced, but that the hydraulic displacement be also reduced to minimize drag or fixed losses in the hydraulic circuit.

A still further object of the invention is the provision of an infinitely variable power transmission including friction clutch means in the drive path wherein the motoring losses of the hydraulic elements are reduced to a minimum when the transmission is operating at a substantially 1:1 ratio.

Yet another object of the invention is to provide an infinitely variable power transmission wherein automatic self-synchronization of certain elements in the mechanical power path of the apparatus is obtained thereby eliminating the necessity of certain clutches or synchronizing devices.

Other objects and many attendant advantages will become more apparent when considered in connection with the specification and accompanying drawings, wherein:

FIG. 5 is a somewhat schematic illustration of a portion of the planetary gearing arrangement connected with the output means of the apparatus;

FIG. 6, FIG. 7, FIG. 8 and FIG. 9 are graphs illustrating certain operating characteristics of the apparatus shown in FIGS. 1, 2 and 4;

FIG. 10 is a schematic illustration of a control system for use particularly with the apparatus shown in FIG. 4 of the drawings;

FIG. 11 is a longitudinal sectional view through a further modified form of the invention wherein certain of the elements are self-synchronizing with one another;

FIG. 12 is a schematic illustration of the planetary gearing arrangement employed in the apparatus shown in FIG. 11;

FIG. 18 is a schematic illustration of a portion of the control system particularly adapted for use with the apparatus shown in FIG. 11;

FIG. 19 is a longitudinal sectional view through a further modified form of the invention;

FIG. 20 is a schematic illustration of the planetary gearing arrangement employed in the apparatus shown in FIG. 19, and is a view taken substantially along line 20—20 of FIG. 19 looking in the direction of the arrows.

Figure 1:
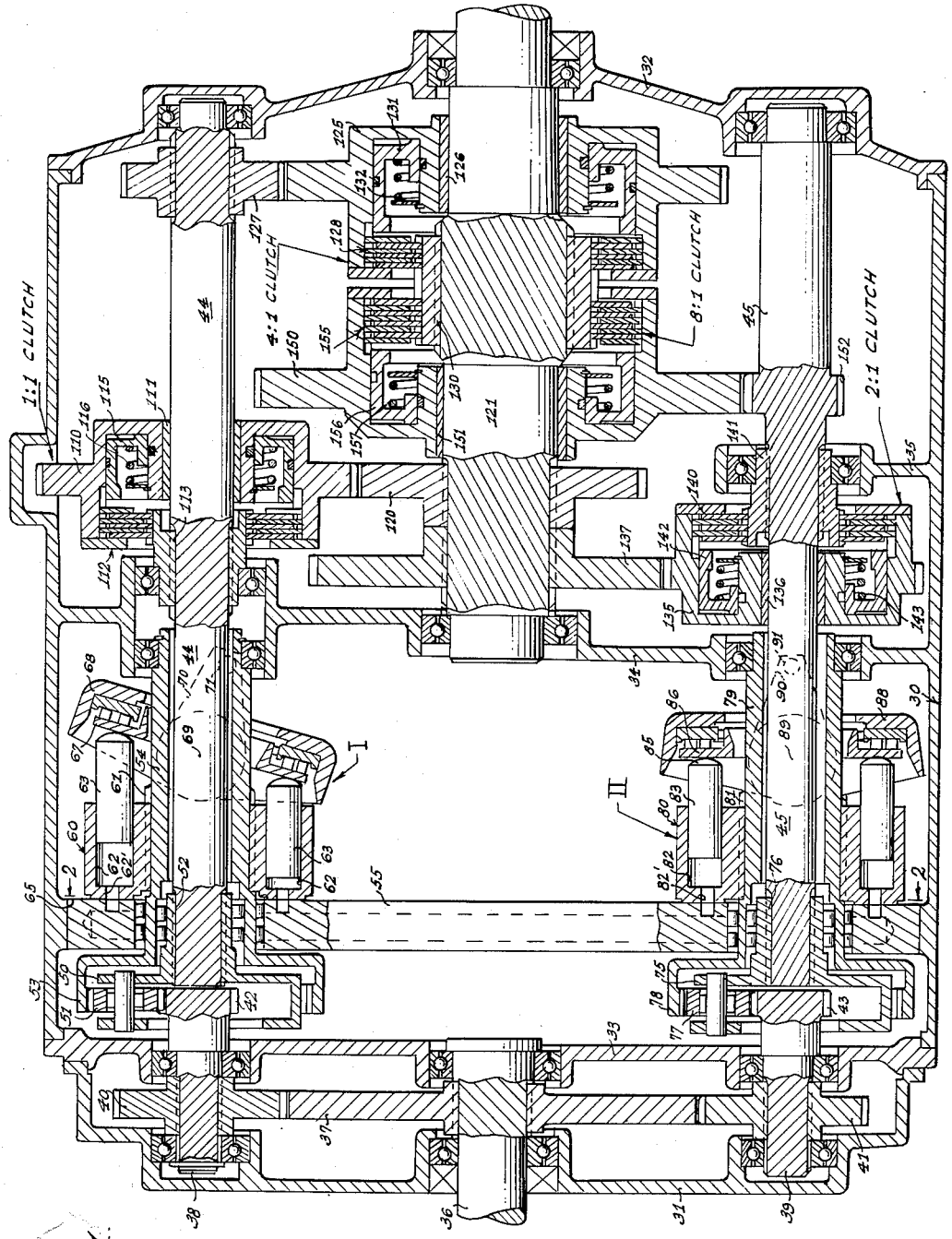
FIG. 1 is a longitudinal section through one embodiment of a transmission according to the present invention.

Referring now to the drawings wherein like reference characters designate corresponding parts throughout the several views, there is shown in FIG. 1, a first modification of the invention including a casing 30 having opposite end walls 31 and 32 as well as intermediate supporting interior walls 33 and 34 which extend across the casing. An interior wall 35 is also provided which extends only partly across the cross-sectional area of the casing. An input means or drive shaft 36 is journaled in walls 31 and 33 and a gear 37 is keyed to the terminal end portion of the drive shaft.

A first short shaft 38 is journaled within the upper portions of walls 31 and 33 and a second short shaft 39 is journaled within the lower portions of walls 31 and 33. Shafts 38 and 39 have gears 40 and 41 keyed thereto, the latter gears each meshing with gear 37 keyed to the input shaft.

The outer ends of shafts 38 and 39 terminate in pinions 42 and 43 respectively. Intermediate drive shafts 44 and 45 extend from a point adjacent pinions 42 and 43 respectively to a point adjacent the end wall 32 of the casing, shafts 44 and 45 being journaled at the central portion thereof in intermediate interior wall 34 and being journaled at the outer end thereof in end wall 32. Each of shafts 44 and 45 is connected to the pinions 42 and 43 respectively by means of identical planetary gearing arrangements hereinafter described.

Referring firstly to the upper shaft 44, a planet carrier member 50 has journaled thereon a plurality of planet gears 51 which may be typically three in number, only one of which is visible on the drawing, the planet carrier 50 being splined to a forward end portion of shaft 44 at the portion indicated by reference numeral 52.

The ring gear 53 of the planetary gearing is connected with a tubular shaft 54 which extends rearwardly of the ring gear, the tubular shaft being journaled within plate member 55 which extends laterally across the casing, the planet carrier 50 also including a tubular portion which is journaled within portion 54 of the ring gear means, thereby rotatably supporting the various elements within the plate means 55. It will be apparent that the planetary gearing described is of a conventional construction including a sun gear 42, a planetary gear 51 and a ring gear 53, the operation of which is well understood.

A first hydrostatic element 60 is of an annular configuration and is keyed at 61 to the outer surface of tubular portion 54 of the ring gear such that hydrostatic element 60 is rotatably fixed to the ring gear of the planetary gearing. Hydrostatic element 60 is of conventional construction being provided with a plurality of cylinders 62 within which the conventional pistons 63 are adapted to reciprocate. Hydrostatic element 60 has a running sealing fit with the adjacent surface 65 of the plate 55. The forward ends of each of the cylinders 62 is provided with a port 62' for a purpose hereinafter described.

The rear rounded end portion 66 of each of the pistons engage a plate 67 which is rotatably mounted on a conventional swash plate 68, the swash plate being pivotally supported by the casing for rocking movement about a pivot axis indicated at 69. The movement of swash plate 68 is controlled by a rearwardly extending control lug 70 having a pin 71 extending therefrom, the operation of this control means being hereinafter set forth. Referring now to the lower intermediate drive shaft 45, the arrangement is identical with the gearing described in connection with shaft 44. A planet carrier 75 has a tubular portion thereof keyed at 76 to the forward end of shaft 45, a plurality of planet gears 77 being rotatably supported by the planet carrier as previously discussed and meshing with the pinion 43.

A ring gear 78 is provided which includes a rearwardly extending tubular portion 79, this latter tubular portion being journaled between the plate 55 and wall 34 while the tubular portion of the planet carrier is journaled within the tubular portion of the ring gear.

A second hydrostatic element 80 is keyed at 81 to a tubular portion of ring gear 78 such that hydrostatic element 80 is rotatably fixed to ring gear 78, element 80 being of a similar construction to element 60 and including a plurality of cylinders 82 within which conventional pistons 83 are slidably mounted. Ports 82' are provided at the forward end of each of the cylinders for a purpose hereinafter described.

The rearward rounded faces 85 of pistons 83 engage a ring 86 which is rotatably supported by a swash plate 88, the swash plate being pivotally supported by the casing for pivotal movement about an axis 89. Swash plate 88 includes a rearwardly extending control lug 90 having a laterally extending pin 91 at the rear portion thereof for a purpose hereinafter described.

Figure 2:
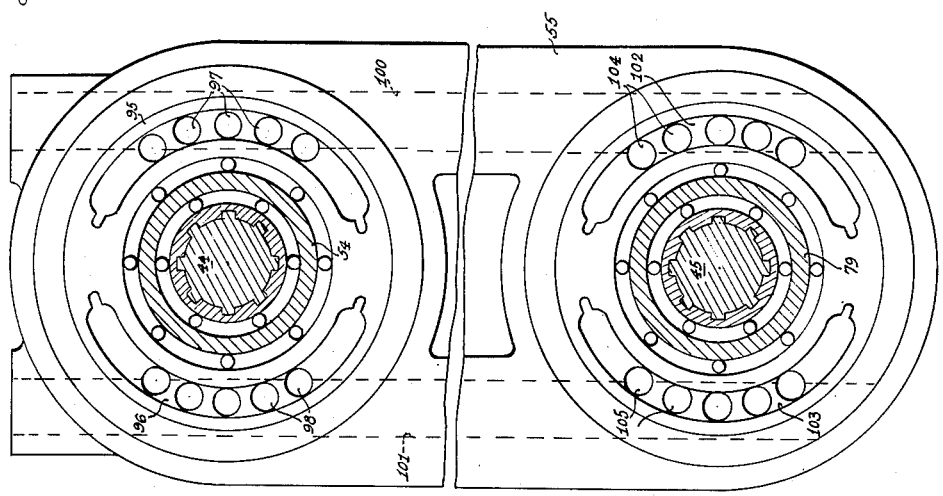
FIG. 2 is a sectional view taken along line 2—2 of FIG. 1 looking in the direction of the arrows.

Referring now to FIG. 2, the plate 55 is seen to include a first pair of symmetrically disposed kidney ports 95 and 96 at the upper portion thereof, these kidney ports in turn providing communication between flow passages 97 and 98 respectively, these latter flow passages communicating with vertically extending communication or flow conduits 100 and 101 respectively. It will be understood that the ports 62' of the cylinders formed within hydrostatic element 60 communicate with the kidney ports 95 and 96 and thereby communication is provided with the vertically extending conduits 100 and 101.

Similar symmetrically disposed kidney ports 102 and 103 are provided at the lower portion of plate 55 which may be referred to as a distributor valve plate as it is commonly called in the art, each of kidney ports 102 and 103 communicating with flow ports 104 and 105 respectively. Flow ports 104 and 105 also are in communication with the vertically extending conduits 100 and 101 to thereby provide communication between the upper and lower kidney ports. It will, of course, be understood that ports 82' formed in the cylinders of hydrostatic element 80 are in communication with kidney ports 102 and 103. The above-described construction will readily be understood by one skilled in the art to represent a pump and motor arrangement wherein the amount of power transmitted between the two hydrostatic elements 60 and 80 is controlled by the position of the swash plate means 68 and 88 respectively.

Referring now to the righthand portion of the apparatus shown in FIG. 1, a first gear 110 is journaled by a bushing 111 upon the rear portion of shaft 44, and a multiple disc clutch 112 is adapted to drivingly connect gear 110 to an inner clutch member 113 splined to shaft 44. A clutch actuating piston 115 is normally biased to release position by a spring 116, it being understood that fluid pressure can be applied to the righthand portion of piston 115 for actuating clutch 112 when desired. Gear 110 meshes with a gear 120 splined to the output means or driven shaft 121. The ratios of the gears connecting the input shaft with the output shaft through the intermediate driving connection including shaft 44 and the planetary gearing associated therewith when clutch 112 is engaged are such as to provide a 1:1 ratio, all driving ratios as hereinafter expressed being in terms of the speed of the input shaft to the speed of the output shaft. Obviously, a 1:1 ratio means that the output shaft rotates at the same speed as the input shaft. Accordingly, clutch 112 will be referred to as the 1:1 clutch.

It will be understood that the ratio of the intermediate drive connections is infinitely variable and is effected by rotation of the planetary ring gears. Accordingly, the ratio of the intermediate drive connection clutches hereinafter expressed such as 1:1 and 2:1 refers to the ratio that is provided when the planetary gearing ring gear associated therewith is locked.

A gear 125 is journaled by bushing 126 on the output shaft 121, gear 125 meshing with gear 127 which is splined to the rear portion of shaft 44. A multiple disc clutch 128 serves to drivingly connect gear 125 with an inner clutch member 130 splined to the output shaft. An operating piston 131 is provided for engaging clutch 128, the piston 131 normally being biased to release position by a spring 132, hydraulic pressure being applied to the righthand portion of piston 131 when it is desired to engage clutch 128.

The gear ratios of gears 127 and 125 in combination with the driving connection between the input shaft and shaft 44 when clutch 128 is engaged are such as to provide a 4:1 speed ratio from the input shaft to the output shaft, and accordingly, clutch 128 will hereinafter be referred to as the 4:1 clutch.

Referring to the lower intermediate shaft 45, a gear 135 is journaled by a bushing 136 on shaft 45 and meshes with a gear 137 splined to the output shaft 121. A multiple disc clutch 140 is adapted to couple gear 135 to an inner clutch member 141 splined to the rear portion of shaft 45. An operating piston 142 is provided for engaging clutch 140, the operating piston normally being biased to release position by a spring 143. It will be understood that hydraulic pressure applied to the left side of piston 142 will cause clutch 140 to be engaged. The gear ratio between gears 135 and 137 along with the driving connection between the input shaft and intermediate shaft 45 are adapted to provide a speed ratio of 2:1 from the input shaft to the output shaft, and accordingly, clutch 140 will be hereinafter referred to as the 2:1 clutch.

A gear 150 is journaled by bushing 151 upon the output shaft and meshes with a gear 152 fixed to shaft 45. A multiple disc clutch 155 is provided for selectively coupling gear 150 to inner clutch member 130 splined to the output shaft. An operating piston 156 is provided for engaging clutch 155, the operating piston being normally biased to release position by spring 157. It will, of course, be understood that hydraulic pressure applied to the left side of piston 156 will cause clutch 155 to be engaged. The gear ratio between gears 150 and 152 as well as the driving connection between the input shaft and intermediate drive shaft 45 is such as to provide a speed ratio between the input shaft and the output shaft of 8:1, and accordingly, clutch 155 will be referred to hereinafter as the 8:1 clutch.

As mentioned previously, a control system is interconnected with the swash plates and clutches of the apparatus to provide a novel intercooperation therebetween, this control system being hereinafter described. For the time being the operation of the apparatus shown in FIG. 1 will be described without referring to the control system itself in order to point out the manner in which the objectives of the present invention are accomplished by shifting and controlling the elements of the transmission shown in FIG. 1.

The operation of the transmission shown in FIG. 1, will be more readily understood by reference to the graph shown in FIGS. 6, 7, 8 and 9. Assuming that the apparatus is initially engaged at a 1:1 drive ratio, the shifting of the apparatus from the 1:1 drive ratio to an 8:1 drive ratio will be described, it being evident that the reverse direction from an 8:1 ratio up to a 1:1 ratio will be the direct reverse of the operation hereinafter set forth.

The hydrostatic element 60 or the upper element will be referred to as element I in the folowing description, and the lower hydrostatic element 80 will be referred to as element II.

When the transmission seen in FIG. 1 is at a 1:1 drive ratio, the 1:1 clutch and the 2:1 clutch are engaged and the swash plate of element I is disposed at its full angle and the swash plate of element II is disposed at a zero angle, this position of the swash plate being shown in FIG. 1.

In this condition, element II is free to turn without displacing or receiving any fluid in the hydraulic circuit, and since element II can not accept fluid from element I, element I is hydrostatically locked with respect to the swash plate 68, thereby holding element I stationary along with the ring gear 53 of the upper planetary gearing.

Since both sun gears 42 and 43 are continuously rotated by the input drive shaft 36, the planet gears 51 will react with the stationary ring gear 53 to drive the planet carrier member 50 which in turn drives shaft 44. Since the 1:1 clutch is engaged in this condition, the driven shaft will be driven at a 1:1 speed ratio, and no torque is transmitted through the lower planetary gearing and shaft 45 since the ring gear 78 is free to rotate. Accordingly, all the power is transmitted through the upper intermediate driving connection including the shaft 44 and the upper planetary gearing. There is no hydraulic flow under these conditions, and consequently, the power path is 100% mechanical through the transmission thereby providing maximum efficiency.

Referring now to FIG. 6, it will be noted that with a 1:1 driving ratio, the element I swash plate is disposed at full angle, and the element II swash plate is disposed at zero angle. As seen in FIG. 8, no hydraulic power is being transmitted through the hydrostatic circuit at a 1:1 drive ratio. As seen in FIG. 9, at a 1:1 driving ratio, element I is stationary while the output shaft and element II are rotating at the same speed as the input shaft.

Considering now that the transmission is shifted from 1:1 ratio toward the 2:1 ratio indicated as .5 on FIGS. 6, 7, 8 and 9, it will be seen in FIG. 6 that the angle of the swash plate associated with element I decreases from full angle at the 1:1 ratio to a zero angle at a 2:1 ratio while the angle of the swash plate associated with element II increases from a zero angle to a full angle at a 2:1 ratio.

As seen in FIG. 7, the internal pressure of the hydrostatic power transmission means remains substantially constant throughout this shifting range, the relative pressure being indicated as 1, and it being understood that this can represent any particular pressure such as 1000 p.s.i., and in such case, the value 1.5 of the relative pressure would represent 1500 p.s.i., etc.

As the transmission is shifted from the 1:1 ratio to a 2:1 ratio, an inspection of FIG. 8 indicates that the amount of power transmitted through the hydrostatic transmission means increases from zero to a maximum value of approximately 19 percent and it again decreases to 0 at the 2:1 ratio whereat the transmission of power is again entirely through the mechanical portion of the transmission.

An inspection of FIG. 9 indicates that as the transmission is shifted from 1:1 to a 2:1 ratio, the speed of hydrostatic element II decreases as well as the speed of the output shaft. Simultaneously the speed of element I increases in a negative direction.

At any intermediate speed ratio between 1:1 and 2:1, the swash plates of elements I and II will be disposed at some intermediate angle. This permits both of the hydrostatic elements to rotate, the plus portion of the graph shown in FIG. 9 indicating rotation in the same direction as the planetary sun gears and the minus portion indicating a rotation in a reverse direction with respect to the sun gears. At an intermediate ratio of .70 as indicated on FIGS. 6–9, the 1:1 clutch and the 2:1 clutch are still engaged, and the sun gears 42 and 43 of each planetary gearing are rotated. The planet gears 51 react on ring gear 53 to drive the intermediate shaft 44, this reaction causing element I to turn and causing a displacement of fluid into element II.

The displaced fluid in the hydrostatic transmission means drives element II. The planet gears 77 react against ring gear 78 connected with element II to thereby drive the intermediate shaft 45.

Under the condition, both planetary gearings are transmitting torque to the output shaft, and since there is hydraulic fluid flow between elements I and II, a portion of the power is being transmitted from the upper power path to the lower power path. At no time during such shifting does the hydraulic power transmission means transmit more than 20 percent of the total power.

When the transmission reaches a 2:1 ratio, the 1:1 clutch and the 2:1 clutch initially remain engaged and as seen in FIG. 6, the swash plate of element I is now positioned at a zero angle while the swash plate of element II is positioned at a full angle. The result is that element II is now hydrostatically locked with respect to the swash plate 88, and element I is free to rotate.

The transmitted power now passes entirely through the lower power path and a completely mechanical driving connection is provided which causes the output shaft to rotate at one-half the speed of the input shaft. Since all the power is now being transmitted through the lower planetary gearing, there is no torque output from shaft 44. Since there is no torque then being transmitted through shaft 44, the 1:1 clutch is disengaged and the 4:1 clutch is engaged by the control system hereinafter discussed.

It is accordingly clear that the 1:1 clutch disengages and the 4:1 clutch engages while both are under no-load condition from the input shaft thereby effecting a very smooth shifting without any interruption of the power circuit and without producing any substantial wear on the friction elements of either clutch.

Considering now that the transmission is to be shifted from the 2:1 ratio down to the 4:1 ratio, as seen in FIG. 6, the angle of the swash plate associated with element II will be decreased from full angle to zero angle while the angle of the swash plate associated with element I will be increased from zero angle to full angle. As seen in FIG. 7, the pressure within the hydrostatic transmission means remains substantially constant throughout this shifting.

Referring to FIG. 8, it will be seen that the percentage of power transmitted through the hydrostatic transmission means increases to a maximum value within the shifting range. The plus portion of the graph shown in FIG. 8 represents conditions wherein the power flow in the hydraulic means is from element I to element II, while the negative portions of the graph indicate conditions wherein the power flow is from element II to element I. An inspection of FIG. 9 indicates that when shifting from the 2:1 ratio down to the 4:1 ratio, the speed of the output shaft decreases while the speed of element II increases in a negative direction. At the same time, the speed of element I decreases from substantially the speed of the input shaft to zero in this shifting range.

Referring to operation at an intermediate ratio between 2:1 to 4:1 as indicated in the graph in FIG. 8, element II will displace fluid into element I thereby transmitting a portion of the power through the hydrostatic transmission means.

When the transmission reaches the 4:1 ratio as indicated by the abscissant of .25 on the various graphs in FIGS. 6, 7, 8 and 9, the 2:1 and 4:1 clutches are still initially engaged. The swash plate of element I is now again at full angle, while the swash plate of element II is at a zero angle, it being the same condition as the 1:1 operation with the exception that shaft 44 now drives the output shaft through the 4:1 clutch, and the power path is again 100 percent mechanical with the hydrostatic element I locked with respect to swash plate 68 and the hydrostatic element II free to rotate. In this condition, shaft 44 is again transmitting no torque to the output shaft, and under this condition, the 2:1 clutch is disengaged and the 8:1 clutch is engaged. Here again, since no torque is being transmitted from shaft 45 to the output shaft, the 2:1 clutch can be disengaged while the 8:1 clutch can be smoothly engaged with no interruption of power flow and without producing any substantial wear on the elements of either clutch.

Considering now the shifting of the speed ratio from 4:1 to 8:1 as seen in FIG. 6, the swash plate associated with element I will be decreased from full angle to zero angle while the swash plate associated with element II will be increased from zero angle to full angle. During this shifting range, it will be noted that the pressure within the hydrostatic transmission means remains substantially constant as seen in FIG. 7, and that the amount of power transmitted through the hydrostatic transmission means increases to approximately 17 percent.

As seen in the graph shown in FIG. 9, the speed of element I increases negatively while the speed of the output shaft continually decreases during this shift range, and the speed of element II decreases from a speed substantially equal to that of the input shaft to zero.

At the 8:1 ratio, the swash plate of element II is again positioned at full angle and the swash plate of element I is positioned at zero angle. The shaft 45 is now transmitting the drive through the 8:1 clutch to the output shaft, and the transmission of power is now again 100 percent mechanical with element II hydrostatically locked with respect to swash plate 88 and element I free to rotate.

It will be seen from the foregoing description that in shifting from the 1:1 ratio to the 8:1 ratio, there is no interruption of the power path nor are any of the mechanical clutches engaged or disengaged while under load. This effects a very smooth and continuous operation at all speed ratios.

It is also significant to note that over this entire shifting range, there is no multiplication of torque within the hydrostatic transmission means, and that the hydrostatic transmission operates at a substantially constant pressure.

When at the 8:1 ratio, the swash plate of element I may be positioned over center to provide a greater ratio than the 8:1 multiplication. This, however, is accomplished by multiplying torque within the hydrostatic transmission means which, of course, results in an increase in pressure within the hydrostatic circuit.

Referring again to operation at the 1:1 ratio, the element II swash plate may be positioned over center to thereby provide an overdrive which will also result in a slight increase in pressure in the hydrostatic circuit.

Referring further to the 1:1 operation, it may be seen in FIG. 9 that element I is stationary while element II is rotating and the 1:1 and 2:1 clutches are engaged. It is apparent from the foregoing discussion that at this ratio, the element I becomes hydrostatically locked with respect to the swash plate 68 and that element II rotates freely. Accordingly, all the power is transferred by the upper intermediate drive means through the shaft 44 and the 1:1 clutch. At this condition, the 2:1 clutch which is under no load may be disengaged thereby disconnecting the shaft 45 from the output shaft 121. Since the shaft 45 is now free to rotate at any speed, the planet gears 77 of the lower planetary gear train react on the ring gear 78 to freely drive the planet carrier and shaft 45. The reaction torque on the ring gear is too small to overcome the inherent drag torque of the hydraulic element II and therefore, element II does not rotate. At this operation neither element I or element II is rotating thereby reducing wear and motoring losses which, of course, improves the efficiency of the 1:1 drive ratio. When operation other than 1:1 is required, the 2:1 clutch is again engaged under no load and the transmission functions in a normal manner.

Figure 3:
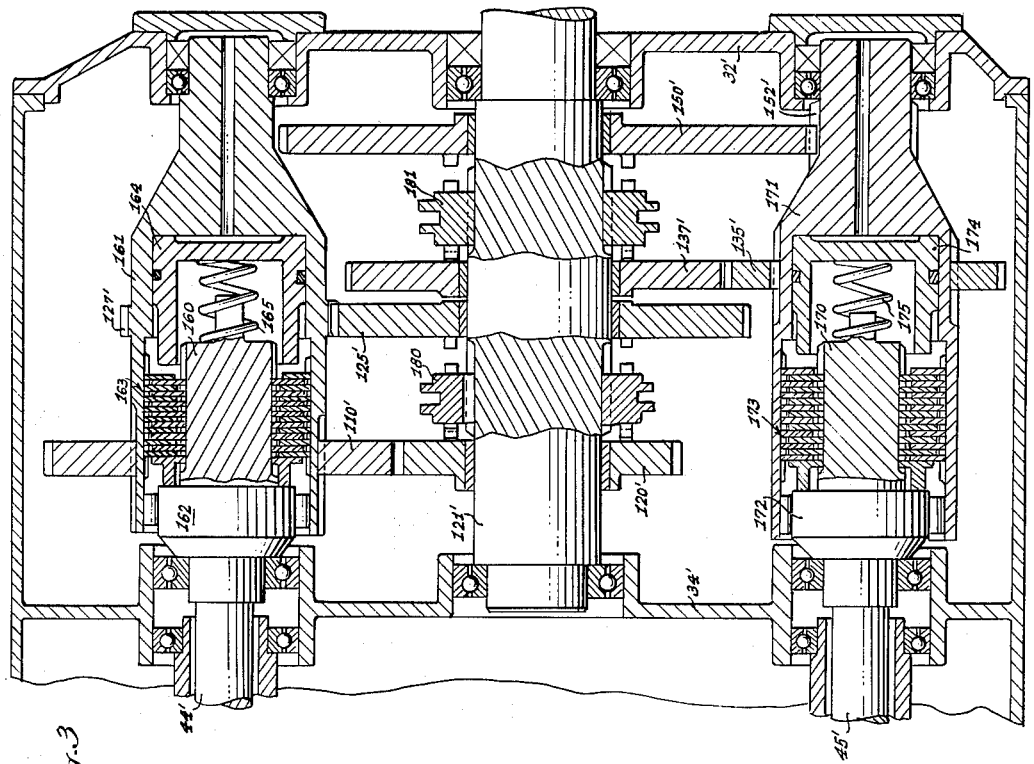
FIG. 3 is a longitudinal sectional view of a portion of a modified transmission similar to that shown in FIG. 1.

Referring now to FIG. 3 of the drawings, a modification is illustrated wherein corresponding parts have been given the same reference numeral primed.

In this modification, the outer end of intermediate drive shaft 44' terminates in a reduced spline portion 160. A hollow tubular member 161 is journaled about portion 162 of shaft 44' and within the end wall 32', the interior of the tubular member being adapted to be coupled to shaft 44' by a multiple disc clutch 163. An operating piston 164 is provided for clutch 163, the operating piston 164 being normally biased to release position by spring 165. The output gears 110', 120' cooperate to provide a 1:1 drive ratio and the output gears 127' and 125' cooperate to provide a 4:1 gear ratio. It is clear that hydraulic pressure applied to the right side of piston 164 will cause engagement of clutch 163.

The rear portion of intermediate drive shaft 45' terminates in a reduced end portion 170 which is surrounded by a hollow tubular member 171 journaled between the portion 172 of shaft 45' and the end wall 32'.

A multiple disc clutch 173 is adapted to drivingly interconnect shaft 45' with the tubular member 171. An operating piston 174 is provided for engaging clutch 173, a spring 175 being provided for normally urging piston 174 to release position. Gears 135', 137' cooperate to provide a 2:1 drive ratio and gears 152' and 150' cooperate to provide an 8:1 ratio.

Each of gears 120', 125', 137' and 150' are journaled on the output shaft 121' by means of suitable bushings, these gears being provided on the lateral faces thereof with positive clutch teeth adapted to engage and be drivingly connected with shiftable synchromesh clutch members 180 and 181, each of which is slidably splined to the output shaft 121'. It is apparent that synchromesh devices 180 and 181 can be shifted axially to clutch the various gears to the output shaft.

This modification basically operates in the same manner as the modification shown in FIG. 1, it being understood that a portion of the transmission to the left of that shown in FIG. 3 is identical with a corresponding part of the portion shown in FIG. 1. The difference in operation of the transmission shown in FIG. 3 as compared to that shown in FIG. 1 lies in the operation of the clutch and synchromesh devices at the shift points corresponding to the 1:1, 2:1, 4:1 and 8:1 ratios. At the point of ratio change in the modification shown in FIG. 3, one of the clutches 163 or 173 is disengaged, it being understood that the clutch associated with the shaft 44' or 45' which is not transmitting drive torque at the shift point will be the clutch which is disengaged. Upon disengagement of clutch 163, for example, the synchromesh device 180 will be shifted to engage one of the gears 120' or 125' depending on which way the transmission is being shifted. In a like manner upon disengagement of clutch 173, shiftable synchromesh device 181 will be shifted to engage one or the other of gears 137' or 150' depending on which way the transmission is being shifted.

The advantage of the arrangement shown in FIG. 3 is that many additional drive gears may be added to each of the tubular member 161 and 171 to extend the full power range of the transmission without adding additional multiple disc clutches and the like. Comparing the modification shown in FIG. 3 with that shown in FIG. 1, it will be noted that fewer multiple disc clutches are employed thereby substantially reducing the size and cost of the transmission.

Figure 4:
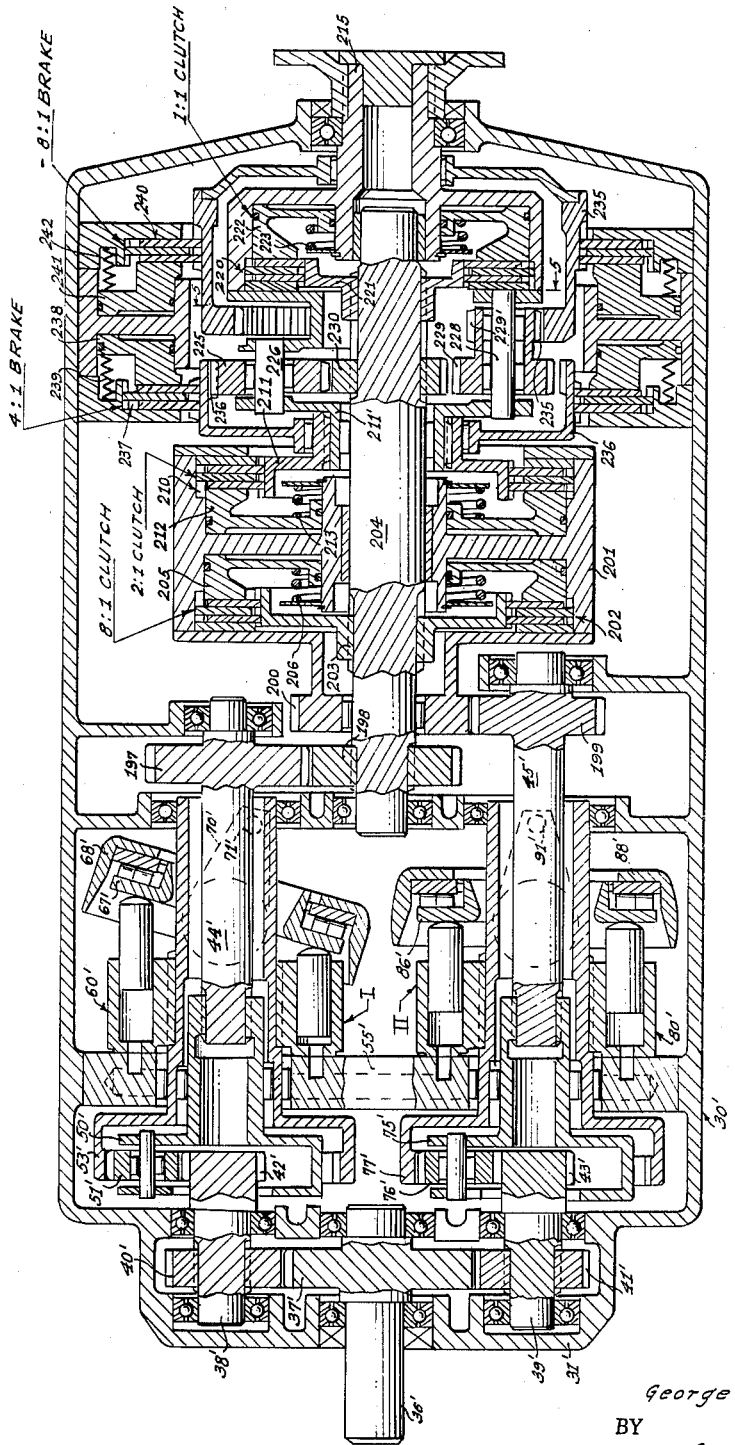
FIG. 4 is a longitudinal sectional view through a further modified form of the transmission according to the present invention.

Referring now to FIG. 4 of the drawings, a further modification of the invention is illustrated wherein the apparatus is substantially identical with that shown in FIG. 1, for example, in the manner in which the input shaft is connected to the intermediate driving connections, and the similar components have been given the same reference numerals primed, it being noted that the intermediate drive shafts 44' and 45' correspond to the shafts 44 and 45 of the modification shown in FIG. 1.

In the modification shown in FIG. 4, the mechanical clutching arrangement between the intermediate drive shafts and the output shafts has been modified to provide a more compact and lighter construction employing output gearing of a planetary type, it is being noted, however, that the over-all principle of operation is the same as that discussed in connection with FIG. 1.

Gear 199 on the end of shaft 45' meshes with gear 200 formed on a rotatable housing 201. The ratio of the gearing connecting the input shaft 36' with the rotatable housing 201 including shaft 45', gears 199 and 200, and the planetary gearing associated therewith are such as to provide a 2:1 ratio. Accordingly, housing 201 rotates at one-half the speed of the input shaft.

Gear 197 on the end of the shaft 44' meshes with gear 198 which is splined to the central shaft 204. The gearing connecting the input shaft 36' with the central shaft 204 including shaft 44, gears 197 and 198, and the planetary gearing associated therewith are such as to provide a 1:1 ratio. Accordingly, central shaft 204 rotates at the same speed as the input shaft.

It is understood that as described in the foregoing discussion, the immediately preceding ratio of 1:1 and 2:1 refers to the ratio that is provided when the planetary ring gear associated therewith is locked.

A friction disc clutch 220 is located at the rear end of the shaft 204 to drivingly connect shaft 204 to the output shaft 215. The inner hub member 221, is splined to the central shaft 204. An operating piston 222 is provided for engaging clutch 220, piston 222 normally being biased to the release position by a spring 223. When clutch 220 is engaged the output shaft wil be driven by shaft 204 at a 1:1 ratio and accordingly clutch 220 will be hereinafter referred to as the 1:1 clutch.

A second multiple disc clutch 210 is adapted to drivingly interconnect rotatable housing 201 with a hub member 211, member 211 being rigidly connected to planet carrier member 211'. Carrier member 211' forms part of the 1:1 clutch outer housing which in turn is rigidly connected to the output shaft 215. An operating piston 212 is provided which engages clutch 210 and a spring 213 normally biases piston 212 to the release position.

When clutch 210 is engaged, the rotatable housing 201 drives the output shaft 215 at one-half the input speed, and accordingly, clutch 210 will be referred to as the 2:1 clutch in this modification.

A compound planetary gear connection is provided wherein a first plurality of planet gears 225 are rotatably supported by the pin member 226 supported by carrier 211'. Separate pin members 228 support a cluster gear 229–229'. Planet gears 225 mesh with gear 230 which is splined on the central shaft 204, it being noted that cluster gear portion 229 does not mesh with gear 230, and that gear 229' meshes with the ring gear 235.

The construction of the compound planetary gearing just referred to will be more clearly understood from inspection of FIG. 5, wherein it will be seen that gears 225 mesh directly with the gear 230, while gears 229 mesh with gears 225.

Since this type of planetary gear system is well understood by one experienced in the art, it is only necessary to specify that the ratio of gear diameters is selected to provide a 4:1 reduction ratio from the sun gear 230 to the carrier member 211' when the first ring gear 236 is locked or coupled to the case. When the second ring gear 235 is coupled to the case, the diameters of the gears are further selected to provide a −4:1 reduction ratio from the sun gear 230 to the carrier member 211', it being apparent that the minus sign indicates the carrier member rotates in the reverse direction.

The ring gear 236 is adapted to be coupled to the casing by means of a multiple disc brake 237. An operating piston 238 is provided for engaging broke 237 and spring 239 normally biases piston 238 to the release position.

When brake 237 is engaged, the planet carrier which is connected to the output shaft 215 is driven at a 4:1 reduction ratio with respect to the central shaft 204. Since shaft 204 in turn drives at a 1:1 ratio, the over-all ratio from the input shaft to the output shaft is also 4:1. Accordingly, the brake 237 is hereinafter referred to as the 4:1 brake.

A forwardmost clutch means 202 is adapted to drivingly interconnect rotatable housing 201 with hub member 203 splined to the central shaft 204. A piston 205 is provided for engaging clutch 202, piston 205 normally being biased to the release position by a spring 206.

Clutch 202 is adapted to function in cooperation with the 4:1 clutch means. When engaged the rotatable housing 201 drives the central shaft 204, it being understood that the 4:1 brake is also engaged. As referred to in the foregoing, when the 4:1 brake is engaged, the reduction ratio from shaft 204 to the output shaft is 4:1. Rotatable housing 201 being in turn driven at a 2:1 reduction ratio from the input shaft, it is apparent that when housing 201 is drivingly connected to the output shaft by means of the 4:1 brake, the over-all ratio from the input shaft to the output shaft is 8:1 and accordingly, the clutch 202 is referred to as the 8:1 clutch.

Ring gear 235 is adapted to be coupled to the casing by means of a friction disc brake 240. An operating piston 241 is provided for engaging brake 240, and a spring 242 normally biases the operating piston 241 to the release position. When brake 240 is engaged along with the aforementioned 8:1 clutch, the ring gear 235 is locked to the casing, and due to the compound planetary connection, the output shaft will be driven in a reverse direction at an 8:1 ratio; and accordingly, brake 240 will be referred to hereinafter as the —8:1 brake.

The operation of the mechanical output planetary gearing and clutch means as shown in FIG. 4 is similar in principle to the mechanical output means of the apparatus shown in FIG. 1. When the 2:1 and 1:1 clutches are engaged, the input shaft is connected to the output shaft at a 1:1 ratio. As the angle of the swash plates 68' and 88' are varied from the position shown in FIG. 4, the drive ratio will be accordingly reduced until swash plate 68' is in a zero angle position and swash plate 88' is at a full angle position at which time a 2:1 drive ratio will be obtained. Under this condition, no torque is being transmitted through shafts 44' and 204 to the output shaft, and accordingly, the 1:1 clutch is disengaged while at the same time the 4:1 brake is engaged by locking the ring gear 236 to the casing.

The swash plates may then be adjusted until a 4:1 drive ratio is obtained at which time all the torque is being transmitted by the shafts 44' and 204 while no torque is being transmitted by shaft 45' and casing 201. At this point, the 2:1 clutch is disengaged, and at the same time, the 8:1 clutch is engaged which connects the shaft 45' to shaft 204 at a 2:1 ratio. The shaft 204 is already connected to the output carrier 211 at a 4:1 ratio, so that intermediate drive shaft 45' is now connected with respect to the output shaft at an 8:1 ratio.

It will be apparent that in this arrangement as well as in the foregoing arrangement, all shifting and engagement and disengagement of the various clutches occurs such that there is no interruption in power and under no-load conditions, to minimize wear on the clutch elements.

Additional torque multiplication to provide an underdrive or an overdrive can be obtained in the same manner as discussed in connection with the apparatus shown in FIG. 1, with a resultant increase in pressure within the hydrostatic transmission means. It will be clear that the curves represented in the graphs shown in FIGS. 6, 7, 8 and 9 are equally applicable to the modification shown in FIG. 4.

Referring now to FIG. 10, a control system is schematically illustrated which is especially adapted to be connected with the apparatus as shown in FIG. 4. It should be clearly understood, however, that this control system is equally applicable for use with the modification shown in FIG. 1 with the exception that the reverse clutch and the reverse valve means, of course, is eliminated. Otherwise, the various interconnections as shown in FIG. 10 may be readily employed with this other modification.

The 8:1, 2:1 and 1:1 clutches as well as the 4:1 and —8:1 brakes are readily identified in FIG. 10 and correspond to the similar clutches and brakes in the apparatus illustrated in FIG. 4.

Swash plates 68' and 88' are indicated in phantom lines, the swash plates being pivotally mounted on circular trunnions as previously discussed in a well-known manner. Pins 71' and 91' extend laterally from the control lugs 70' and 90' of the swash plates 68' and 88' respectively. Pin 71' extends through a first cam slot 250 formed in a first cam plate 251 which is slidably mounted within bushings formed in the casing 30'.

In a like manner, the pin 91' connected with swash plate 88' extends through a cam slot 252 formed in a cam plate 253 which is also slidably disposed within bushings mounted within the casing. The two cam plates 251 and 253 are connected for unitary reciprocal movement within the casing by a plate 255, plate being connected to the outer end of a rod 256 which is connected with a piston 257 reciprocably mounted within a cylinder 258. The piston 257 and cylinder 258 comprise an actuator means for actuating the cam plates 251 and 253.

The actuator means of the present invention is controlled by a speed-responsive means indicated generally by reference numeral 260. Speed-responsive means 260 includes a rotatable tubular member 261 which is drivingly interconnected with the input shaft, this driving interconnection being schematically indicated by dotted line 262. Accordingly, tubular member 261 will rotate proportionately with the rotary speed of the input shaft.

Mounted upon a peripheral flange 263 at one end of tubular member 261 are a pair of speed-responsive weight members 265, these weight members engaging a bearing 266 mounted upon a reciprocable shaft 267. It is apparent that the position of 267 axially with respect to the tubular member 261 is determined by the speed of member 261 and the corresponding position of weight members 265.

Two raised annular portions 270 and 271 are provided on shaft 267, these raised annular portions controlling the flow of fluid under pressure from an inlet conduit 272 to a pair of outlet conduits 273 and 274. As illustrated by phantom lines outlet conduit 273 is connected to an inlet port 275 at one end of cylinder 258, and conduit 274 is connected to an inlet port 276 formed at the opposite end of cylinder 258. Conduit 272 is in turn connected with an oil pump 280 as schematically indicated by line 278. The oil pump is driven by the input shaft as schematically indicated by line 281 thereby providing a steady source of fluid pressure at the inlet conduit 272.

It is apparent that variations in speed of the input shaft will produce reciprocable movements of shaft 267 thereby varying the flow of fluid under pressure, in this case oil, to the opposite sides of piston 257. This, of course, will cause the actuator means to move the cam plates in accordance with variations in speed of the input shaft. It is accordingly evident that the raised portions 270 and 271 are so positioned that when fluid is introduced into one of the conduits 273 or 274, it is simultaneously exhausted from the other conduit thereby permitting ready movement of piston 257. The cam plates are also connected by means of a rod 285 to a control cam 286, the control cam having an upper cam portion 287 and a lower cam portion 288 joined by a sharply sloping cam portion 289. The control cam is guided in its reciprocal movement by means of a pair of pins 290 extending through a slot 291 formed in the cam.

At one end of the cam an indicator 295 is provided which cooperates with a fixed scale 296 for indicating the drive ratio of the transmission at any particular position of the cam plates.

Clutch and brake valve means 300 is provided for operating the various clutches and brakes of the transmission, the clutch valve means including three spool valves 301, 302 and 303 which are reciprocably mounted within a valve body, the three spool valves being normally biased in a downward direction by springs 304 and 305 and 306 respectively.

Each of the spool valves has a lower rounded portion which normally bears upon one of the surfaces 287, 288 and 289 formed on the upper surface of the control cam 286.

The oil pump 280 is connected with an inlet conduit 310, inlet conduit 310 in turn being in communication with the bore within which valve members 301 and 302 reciprocate.

A reverse valve indicated by reference numeral 315 is also provided, this reverse valve being shown in the forward position in the drawing, and being adapted to be moved rearwardly in the direction of arrow R to a reverse position as hereinafter discussed.

An inlet conduit 316 of the reverse valve is connected with a conduit 318 in the valve body 300 and thence to the inlet conduit 310 through the bore within which valve member 302 reciprocates. The conduits 320 and 321 of the reverse valve communicate with the sump of the apparatus while the bores 322 and 323 communicate respectively with the 4:1 and the —8:1 brake.

When the control cam 286 is at its leftmost position at an 8:1 forward drive ratio, all of the valve members 301, 302 and 303 are in the raised or up position riding on the surface 287 of the control cam, and the reverse valve is in its forward position. Under these conditions, the 8:1 clutch and the 4:1 brake are engaged. Considering now the governor mechanism 260, the circular cam member 330 may be connected for example to the throttle of the vehicle, this cam acting upon a small reciprocal rod 331 which in turn acts upon a spring 332 to vary the governor bias spring load to thereby effect the control speed.

At the 8:1 speed ratio, full torque is transmitted through the 8:1 clutch. As the piston of the actuator now moves toward the right carrying cam plates 251 and 253 as well as the control cam 286 to the right as seen in FIG. 10, the torque transmitted through the 8:1 clutch is reduced while the torque transmitted through the 4:1 brake is increased due to the change in angle of the swash plates 68' and 88' as governed by the cam slots 250 and 252. At a 4:1 ratio, the entire torque is passing through the 4:1 brake as previously explained and when the control cam reaches this position, valve member 301 moves to its extended lower positions as seen in FIG. 10. This position of valve member 301 releases the 8:1 clutch by venting the hydraulic piston actuating the 8:1 clutch to the sump through conduit 335, and at the same time the 2:1 clutch is engaged through the intermediary of conduit 336 which communicates through the bore within which valve member 303 reciprocates with the 2:1 clutch. Since neither the 8:1 clutch nor the 2:1 clutch is transmitting torque at this time, the transition is made without any interruption in the power path and without producing any wear on the clutches.

As the actuator moves further to the right toward the 2:1 ratio position, the torque passing through the 4:1 brake becomes less while the torque passing through the 2:1 clutch increases due to movement of the swash plates 68' and 88'. When the 2:1 ratio is reached, the entire torque is passed through the 2:1 clutch while the 4:1 brake is then no longer transmitting torque.

When the apparatus reaches the 2:1 ratio, the control cam 286 will have moved to the right to such a position that the valve 302 will move to the downward extended position. As the valve member 302 moves to such a downward position, the hydraulic actuating mechanism of the 4:1 brake is vented to the sump through conduit 335 thereby releasing the 4:1 brake and the 1:1 clutch is placed in communication with the conduit 310 which communicates with the oil pump 280 thereby causing the 1:1 clutch to be engaged.

As the actuator piston 257 moves even further to the right to the 1:1 ratio position, valve member 303 moves to a downward extended position, thereby venting the 2:1 clutch to the sump through conduit 340 to release the 2:1 clutch while the 1:1 clutch remains engaged. In this manner, the 2:1 clutch is disengaged thereby disengaging hydrostatic element II from the driven shaft to reduce wear and motoring losses which, of course, improves the efficiency at the 1:1 ratio drive. Accordingly, since a vehicle is traveling at a 1:1 ratio for a continuous period a large percentage of the time, the control system provides an arrangement whereby the motoring losses are reduced to a minimum by disconnecting one of the hydrostatic elements from the drive chain to the output shaft during such conditions.

Referring again to the 8:1 ratio drive condition which was originally discussed, if it is desired to effect reverse operation of the output shaft, the reverse valve 215 is shifted to the left as seen in FIG. 10. This shifting vents the 4:1 brake to the sump thereby releasing the 4:1 brake and connects the —8:1 brake with a source of fluid pressure passing inwardly through the conduit 316 to the reverse valve. Accordingly, the 8:1 clutch and the —8:1 brake are both engaged under this condition which causes the output shaft to be driven at an 8:1 ratio with respect to the input shaft in a reverse direction. As mentioned previously in the case of the apparatus as shown in FIG. 1, the reverse valve and the —8:1 brake would be eliminated in such a system.

Referring now to FIG. 11 of the drawing, a modification is shown which provides self-synchronization of the output gear elements so that these output gear elements may be engaged and disengaged without the utilization of clutches or auxiliary synchronizing devices.

In this modification, the input shaft 350 is connected with a gear 351 which drives gears 352 and 353 mounted on shafts 354 and 355 respectively. Each of shafts 354 and 355 have pinions 356 and 375 disposed at the outer ends thereof.

Gears 356 and 357 are connected with the intermediate driving connection by means of compound planetary gearings, each of which are identical except for slight differences in some of the gear diameters.

Referring to the upper gearing, gear 356 meshes with a first planet gear 360 which rotates with a second planet gear 361, the two gears forming a cluster gear being mounted for rotation on a pin 362 carried by the carrier member 363.

Cluster gear portion 361 meshes with the ring gear 365 having a tubular portion 366 which is drivingly connected with portion 60' of a hydrostatic power transmission, portion 60' being identical with the portions 60 and 60' previously discussed.

Carrier 363 includes a rearwardly extending tubular portion 370 which is journaled within the casing walls, and a gear 371 is splined to the rear end portion of the carrier member.

Cluster gear portion 361 also meshes with another gear 372 also carried by carrier member 363 and gear 372 in turn meshes with a gear 373 splined to the outer end of an intermediate drive shaft 375 which is concentric with tubular portions 370 and 366.

The construction and operation of the compound planetary gearing referred to above may be better understood with reference to FIG. 12 wherein it is seen that the inner pinion 356 meshes with the planet gears 360 which are connected with gear 361, the gears 361 in turn meshing with the ring gear 365. In addition, the gears 372 which are also carried by carrier 363 mesh with gears 361 and, of course, are rotated to a reverse direction.

The ratio of these gears may be typically as follows:

Upper compound planetary gears:
   356/360 _____ 2.5
   365/361 _____ 3.07
   373/372 _____ 1.61

Lower compound planetary gears (which will
  be later referred to):
   356'/360' _____ 2.5
   365'/361' _____ 4.03
   373'/372' _____ 2.12

It is evident that shaft 375 and tubular portion 370 will be operating in opposite directions. A gear 380 is secured to the rear end portion of shaft 375, and meshes with an idler gear 381 which in turn meshes with a gear 382 which is journaled by suitable bushings on the output shaft 385. A gear 386 is in meshing engagement with gear 371 such that gears 386 and 382 are rotating in the same direction.

The construction of the lower planetary gearing arrangement is identical with the upper planetary gearing except for slight difference in gear diameters only, and accordingly, the lower components have been given the same reference numerals primed. The correspondence of the two compound planetary gearings is apparent, and it is noted that the lower hydrostatic element 80′ is similar to the previously discussed hydrostatic elements 80 and 80′ and cooperates in a similar manner with the upper hydrostatic element 60′.

When the ring gears of either of these compound planetary gearings is locked, the larger planet cluster gear portion 361 or 361′ reacts on the associated ring gear to drive the planet carrier member 363 or 363′. Simultaneously as the planet carrier member rotates, the larger cluster planet gear portion 361 or 361′ also drives the planet idler gear 372 or 372′ which in turn drives the central sun gear 373 or 373′. During this operation, the output ratio or speed between the carrier members 363, 363′ and the shafts 375, 375′ respectively is substantially different and in a reverse direction to one another.

A gear 390 is splined to the rear end portion of tubular shaft 370′ of carrier member 363′ and meshes with a gear 391 journaled upon the output shaft 385. A gear 392 is formed at the rear end portion of shaft 375′ and meshes with an idler gear 393 which in turn meshes with a gear 394 rotatably journaled on the output shaft. Accordingly, gears 391 and 394 rotate in the same direction.

A double-acting direct mesh mechanical clutch element 400 is splined to the output shaft between gears 386 and 382 and a similar clutch element 401 is splined to the output shaft between gears 391 and 394.

Gears 371, 386 provide a 1:1.1 drive ratio and gears 380, 381, 382 provide a 3.33:1 drive ratio. Output gears 390, 391 provide a 1.54:1 drive ratio and output gears 392, 393, 394 provide an 8:1 output gear ratio. It is understood the ratios just referred to are the over-all ratios connecting the input shaft with the output shaft through the planetary gearing associated therewith and including the output gears associated therewith. The operation of the apparatus shown in FIG. 11 will become more apparent when considered in connection with the graphs shown in FIGS. 13–17. Assuming that the apparatus is initially in a 1:1.1 ratio, this is a slight overdrive condition and gears 386 and 391 are clutched to the output shaft as shown in FIG. 11. The element I swash plate is positioned to full angle, and the element II swash plate is positioned at zero angle. Consequently, ring gear 365 is locked to the casing while the ring gear 365′ is free to rotate. Accordingly, full power is transmitted through the planetary gear carrier 363 to drive the output shaft at a 1:1.1 ratio and the power circuit is 100 percent mechanical. At an intermediate 1.25:1 ratio, the swash plates of elements I and II, are positioned at partial angles, and since the input shaft drives the sun gears of both planetary gearings, the hydrostatic element I will displace fluid into the hydrostatic element II. This, of course, reduces the output speed of the element I planetary gearing and both planetary gear trains transmit torque to drive the output shaft.

Figure 16:
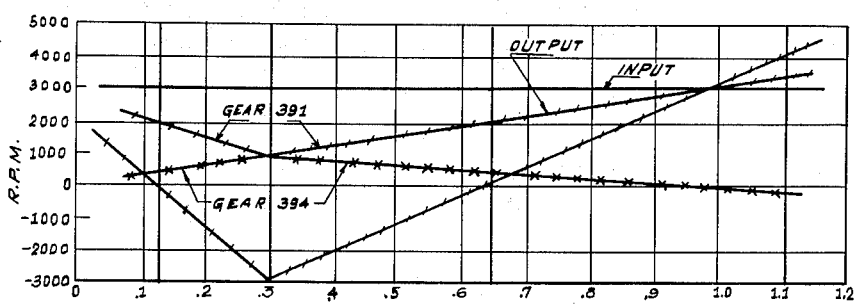
Figure 17:
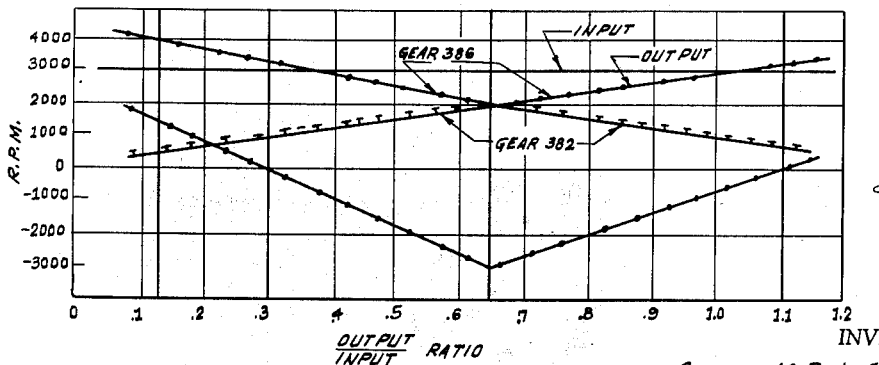

Reference to FIGS. 16 and 17 shows that at the ratios thus far described, gears 386 and 391 have been engaged with the output shaft and therefore their speed or rotation is the same as the output shaft. As the drive ratio increases, or as the output/input decreases, the speed of the disengaged gears 382 and 394 is approaching the output shaft speed.

Figure 13:
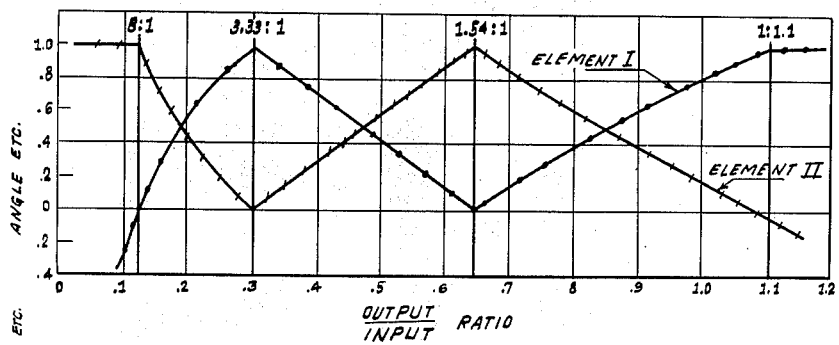
FIGS. 13, 14, 15, 16 and 17 are graphs illustrating certain operating characteristics of the apparatus shown in FIG. 11.

At a 1.54:1 drive ratio corresponding to an abscissa position of .65 of the graphs, it will be seen from FIG. 13 that the element I swash plate is positioned at zero angle while the element II swash plate is positioned at full angle and accordingly, the ring gear 365′ is locked to the casing. At this point of operation, gears 386 and 382 are rotating at the same speed, or in other words they are synchronized. The clutch element 400 is now shifted to disengage gear 386 and to quickly engage gear 382. Since no torque is being transmitted through the upper planetary gearing and intermediate drive connections, and since there is no change in speed of any of the elements or any interruption of the power circuit, this shift may be made very smoothly. The power circuit in this 1.54:1 ratio is again 100 percent mechanical.

As the swash plates are positioned to a partial angle to increase the drive ratio further, the hydrostatic element II displaces fluid into the element I and both planetary gear trains again drive the output shaft to a ratio greater than 1.54:1.

As the drive ratio of 3.33:1 is reached corresponding to an abscissa of .3 on the graphs, it will be seen that the element I swash plate is positioned at full angle in FIG. 13 and the element II swash plate is positioned at zero angle. In this position, ring gear 365 is locked to the casing while ring gear 365′ is free to rotate such that the torque is transmitted to the output shaft through the upper planetary gearing and intermediate drive connection.

As seen in FIG. 16, at a 3.33:1 drive ratio, gears 391 and 394 are now in synchronization and the clutch element 401 is shifted to disengage gear 391 and to quickly engage gear 394. This, of course, can be accomplished smoothly without any interruption in the drive train which is now 100 percent mechanical and with a minimum amount of wear on the clutching elements themselves.

To further increase the drive ratio, the swash plates are again tilted about their pivotal axes, and upon reaching the 8:1 gear ratio corresponding to an abscissa position of .125, as seen in FIG. 13, the element II swash plate is again positioned at full angle and the element I swash plate is positioned at zero angle. Here again, ring gear 365′ is locked to the casing and the driven shaft is driven at one-eighth the speed of the input shaft.

In a manner similar to the discussion of the modification shown in FIG. 1, overdrive and underdrive conditions can be obtained by positioning the swash plates of the two hydrostatic elements I and II at overcenter positions in a manner well understood in the art.

Figure 14:
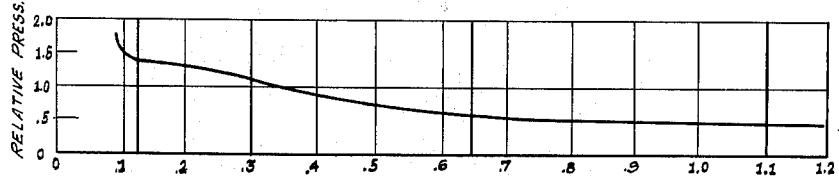

Referring to FIG. 14, it will be noted that the pressures in the hydrostatic power transmission means increased slightly at the higher drive ratios to provide some hydraulic torque multiplication to effect an 8:1 drive ratio. The resultant reduction in life of the hydrostatic elements which may occur due to these increased pressures at high ratios is compensated for due to the fact that the working pressure is substantially reduced at the lower drive ratios.

Figure 15:
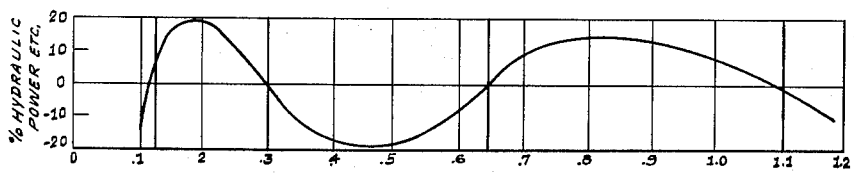

It will be noted from an inspection of FIG. 15 that at no time does the percentage of power transmitted by the hydraulic power transmission means exceed approximately 20 percent of the total power transmitted by the transmission, thereby resulting in the aforediscussed advantages in improving the over-all efficiency of the transmission.

Referring now to FIG. 18 of the drawings, a schematic illustration is provided of a control system suitable for use with the modified structure shown in FIG. 11. In this particular control schematic, it will be understood that the governor, actuator, and cam plate mechanism as shown in FIG. 10 is identical, and accordingly, these components have been eliminated in FIG. 18, but are connected to the control cam 286′ as shown in FIG. 18 in the same manner as disclosed in connection with FIG. 10. The gears shown in FIG. 18 correspond to the same numbered gears shown in FIG. 11.

In this control system, two independently actuated shifter pistons 410 and 411 are provided, each of the shifter pistons being connected with a rod 412 and 413 which are in turn connected by means of shifter arms 414 and 415 to the shiftable clutch members 400 and 401 respectively.

In this case, a valve body 420 includes two spool valves 421 and 422 which are reciprocable within the valve body, each of these spool valves being normally urged in a downward direction by springs 423 and 424 respectively into engagement with the upper surfaces 287' and 288' and 289' of the control cam which is guided in its reciprocable movement by pins 290' which extend through a slot 291' formed in the control cam.

At the 8:1 drive ratio, both valves 421 and 422 are in a retracted position whereby the oil pump 280' is in communication with the conduit 425 and the bores within which the spool valves reciprocate and thence to the left side of piston 410 and the left side of piston 411 to cause gears 382 and 394 to be engaged to the output shaft. At this ratio, full power is transmitted through gear 394 to the output shaft.

As the actuator (not shown) moves the control cam 286' toward the 3.33:1 drive ratio, increased torque is transmitted through gear 382 until at the 3.33:1 ratio, full torque is transmitted through gear 382. At this position, valve 421 moves to its extended position which causes the left side of the piston 411 to be vented to the sump through conduit 430 and simultaneously pressure is applied to the right side of piston 411 to shift clutch member 401 to the left thereby disengaging gear 394 from the output shaft and connecting gear 391 to the output shaft. At this shift point, gear 391 is running at the same speed and in synchronization with the output shaft. Furthermore, since neither gear 391 nor 394 is transmitting any torque, this shift is made with no interruption of the power path and without any substantial wear on the clutch elements. As the actuator moves the control cam toward the 1.54:1 ratio, the torque transmitted through gear 391 increases until at the 1.54:1 ratio full torque is being transmitted through gear 391. When the control cam reaches this position, valve member 422 also moves to its extended position thereby causing the left side of piston 410 to be vented to the sump through conduit 430 and connecting the right side of the piston 410 to inlet pressure coming from the oil pump through conduit 425 into the valve body. This shifts clutch element 400 to the left thereby disengaging gear 382 and engaging gear 386.

As clutch element 400 performs this last-mentioned shift, gear 386 is synchronized with the output shaft and no torque is being transmitted through either of gears 386 or 382. Accordingly, this shift is made with no interruption in the power path and also without producing any substantial wear on the clutch elements.

As the actuator moves toward the 1:1.1 drive ratio, the torque is increasingly transmitted through gear 386 to the output shaft.

Referring now to FIGS. 19 and 20 of the drawings, a further modification of the invention is illustrated which functions basically the same as the modification shown in FIG. 4, the construction of the input planetary gearing being different and the construction of the output planetary gearing also being modified to provide only two stages of operation, and accordingly, there is only one shift point in the operation of this modification.

The construction as shown in FIGS. 19 and 20 is particularly adaptable for use in light trucks and the like where the torque multiplication does not have to be of a very great magnitude.

An input shaft 500 is provided with an input sun gear 501. Sun gear 501 meshes with a planet gear 502 which is journaled on a shaft 503 supported by the planet carrier means 505. Planet gear 502 meshes with ring gear 507 fixed to the stationary casing 508.

Also journaled on shaft 503 is a planet gear 510 which meshes with a ring gear 511 having an integral longitudinally extending hollow shaft portion 512. The planet carrier 505 also carries a shaft 514 upon which is journaled a planet gear 515 meshing with a ring gear 516 which is formed integral with a longitudinally extending hollow tubular portion 517.

Planet gear 510 meshes with a sun gear 520 formed integral with one end of the longitudinally extending tubular shaft 521. Planet gear 515 meshes with sun gear 523 formed at the outer end of the central longitudinally extending shaft 525.

A gear 530 is splined to the outer surface of tubular extension 512 of reaction ring gear 511, gear 530 meshing with a gear 531 formed on a shaft 532. Shaft 532 is in turn drivingly connected with hydrostatic element 535 which will be identified as the hydrostatic element II hereinafter. A conventional swash plate 537 is provided for controlling the operation of the hydrostatic means as is well understood.

A gear 540 is splined to a tubular extension 517 of ring gear 516, gear 540 meshing with gear 541 formed on shaft 542. Shaft 542 is in turn drivingly connected with the hydrostatic element 545 hereinafter referred to as element I, and a conventional swash plate 546 is provided for controlling the operation of the hydrostatic element.

The hydrostatic elements I and II of the modification shown in FIG. 19 are of the same conventional design as the previously discussed modifications and are similarly hydraulically connected by ports in the plate member 548.

The outer or righthand end of shaft 525 as seen in FIG. 19 has splined thereon the inner element 550 of a clutch indicated generally by reference numeral 555 of the multiple disc type. The outer member of the clutch is indicated by reference numeral 551 and comprises a housing which is in turn connected with the output means or flange 552. The multiple disc clutch 555 is provided with an operating piston 556 which is normally biased to the release position by a spring 557. When clutch 555 is engaged, a direct drive is provided from shaft 525 to the output flange, and therefore, this clutch is referred to as the 1:1 drive clutch.

A sun gear 558 is also splined on central shaft 525 and meshes with a gear 560 rotatably journaled on shaft 562 which is supported by planet carrier means 563 which is integral with the outer clutch housing portion 551. The left hand portion of the carrier means 563 is in turn splined to the outer end of the tubular shaft 521 previously described.

Gear elements 565 and 566 form a planet cluster gear which is journaled on shaft 567 which is supported by the planet carrier 563. Gear element 565 meshes with planet gear 560, and gear element 566 meshes with ring gear 571. Ring gear 570 which meshes with planet gear 560 is operatively connected with a brake means indicated generally by reference numeral 573 and comprising a multiple disc type brake including an operating piston 574 which is normally biased to release position by spring 575. Ring gear 571 is also provided with a brake means indicated generally by reference numeral 577 of the multiple disc type and including an operating piston 578 which is normally biased to the release position by spring 579. When brake means 573 is actuated, this brake effects a 4:1 underdrive from the central shaft 525 to the output means, and accordingly, this brake is identified as the 4:1 brake. Brake means 577 when actuated reverses the direction of the output means with respect to the central drive shaft 525, and accordingly, this brake means may be identified as the reverse or —4:1 brake.

The operation of the modification shown in FIGS. 19 and 20 may be more clearly understood from an inspection of FIGS. 21 through 24, which present in graph form various variables or characteristics of the device as a function of the output speed over the input speed.

Let us first consider the point of operation indicated as the 1:1 ratio. At this condition, as indicated on FIG. 21, the element I is positioned at full angle or displacement, while element II is at zero displacement. Since element I can not displace fluid into element II, it is hydrostatically locked from rotation as indicated on FIG.

24. Accordingly, ring gear 516 is also locked against rotation. At this point, the 1:1 drive clutch is engaged and the 4:1 brake and the —4:1 or reverse brake are disengaged.

Figure 23:
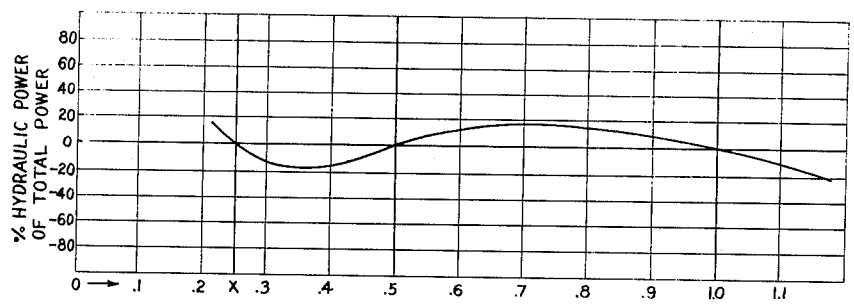
Figure 24:
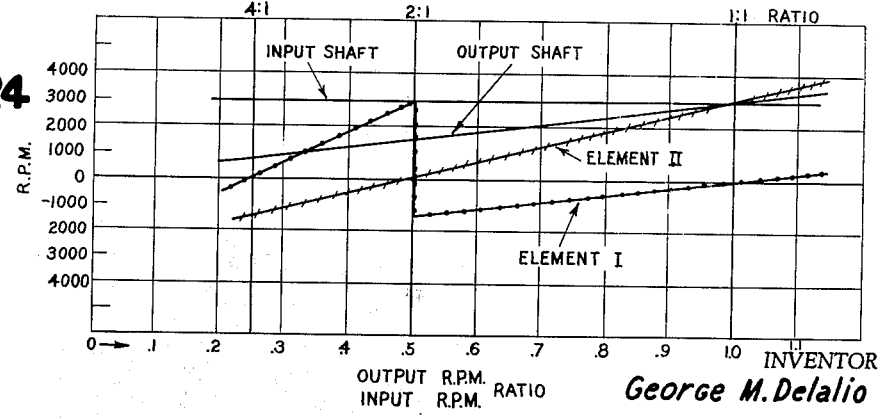

It will be noted that the planetary gear sets 501, 502, 507 and 523, 515, 516 are of the same size. Accordingly, the input sun gear 501 drives the planet gear 502 which reacts on the fixed ring gear 507 to drive the carrier means 505 at a fixed reduction. The planet carrier in turn drives the planet gear 515 which also reacts on the locked ring gear 516 to overdrive the sun gear 523 at the same speed and direction as the input shaft 500. Therefore, at this point of operation, the planetary system provides a 1:1 drive to shaft 525 which directly drives the output flange 552 through the 1:1 clutch, the over-all ratio being 1:1. At this point of operation, there is no hydraulic flow, and the power transfer is totally by mechanical means as indicated in FIG. 23.

As the ratio is changed from the 1:1 point of operation toward the 2:1 point of operation, the element I displacement is decreased, while the element II displacement is increased. This provides flow of hydraulic fluid from element I to element II, element II acting as a motor adding torque through the sun gear 520 to increase output torque while simultaneously reducing the output speed.

At a ratio of 2:1, element I is at zero displacement, while element II is at full displacement. Element II is now hydrostatically locked, while element I is free to rotate. Full torque is then transferred through sun gear 520 at a 2:1 reduction ratio to the output planetary carrier means 563 to the output flange 552. Since ring gear 516 is now free to rotate, central shaft 525 is transmitting no power and torque, and accordingly, the 1:1 drive clutch is under no load.

At this point of operation, in anticipation of any lower ratio, the 1:1 drive clutch is disengaged while at the same instant, the 4:1 underdrive brake 573 is engaged. This transition may be made smoothly without interruption of power, since both the clutch and brake mechanisms are under no load. Again at this ratio, there is no hydraulic flow, and the power is completely transmitted mechanically.

Figure 21:
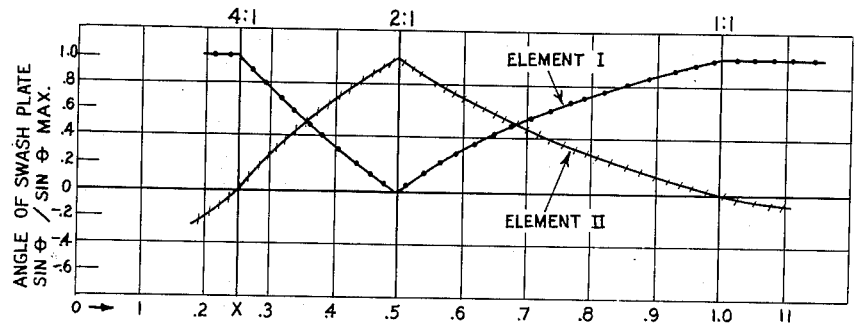
FIG. 21 through FIG. 24 inclusive are graphs illustrating certain operating characteristics of the apparatus shown in FIG. 19.
Figure 22:
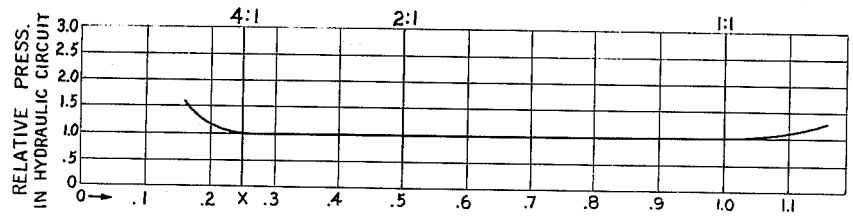

As the swash plates are further positioned toward a 4:1 ratio as shown in FIG. 21, element II displaces fluid into element I, and acting as a motor, its torque is additive to drive shaft 525, the torque of shaft 525 then being multiplied within the output planetary to drive the output flange 552 at a higher torque and lower speed.

At a ratio of 4:1, element I is again at full angle, and full torque is again transferred through shaft 525 and thence through the output planetary to the output means. Additional underdrive and overdrive can be provided beyond the normal range of this specific arrangement, by further positioning the element II swash plate over center as indicated in FIG. 21.

In order to provide full power reverse without regeneration of power which increases the hydrostatic pressure and power level, reverse operation may be effected by positioning the swash plates to an approximately 4:1 ratio and disengaging the 4:1 brake 573 while simultaneously engaging the reverse or —4:1 brake 577. The planet cluster gears 565 and 566 then react on the locked ring gear 571 to drive the planet carrier means 563 and the output flange 552 in the reverse direction.

It is apparent that the basic operation of this modification is the same as the preceding modifications except that the modification shown in FIG. 19 has one less shift point and the necessary clutches associated therewith have been omitted. It should also be understood that it is practical to incorporate in the modification shown in FIG. 19 the same output gearing as used in the modification of FIG. 4 and accordingly incorporate the same number of shift points. Conversely, it is also practical to incorporate the output gearing of the modification shown in FIG. 19 in the modification shown in FIG. 4.

The control system as shown in FIG. 10 may also be employed with the modification shown in FIG. 19, with the exception that the 8:1 and 2:1 clutches and connections are eliminated in such a case.

It is evident that the various ratios and specific planetary gearings as illustrated in the different modifications are merely for the purpose of illustration and that any particular gear ratios could be designed in accordance with the requirements of the particular application. Obviously, various other types of selectively connectable and disconnectable driving connections other than the specific clutch or brake means shown herein could as well be employed.

A modification of the embodiments shown in FIGS. 1, 3, and 4 would be to connect the intermediate drive shaft 45' directly to the output shaft at a 2:1 ratio which would eliminate at least two of the clutches as shown in FIGS. 1 and 4 and at least one of the clutches shown in FIG. 3. This type of modification has been incorporated in the construction shown in FIG. 19 of the drawings. Operation is then from a 1:1 to a 4:1 ratio at constant pressure. For greater torque multiplication, higher operating pressures would be required.

It is apparent from the foregoing that there is provided a new and novel infinitely variable power transmission which provides an infinitely variable drive ratio between an input means and an output means over a wide speed range at full power. A high over-all efficiency is provided for the transmission through a substantial drive ratio from up to 10:1 to 1:1.1 in the modifications shown primarily due to the fact that the hydrostatic power transmission means does not transmit more than approximately 20 percent of the total transmitted power and usually considerably less.

The transmission according to the present invention effectively avoids any shifting of the mechanical drive connections such as clutches or brakes when under torque or under load, reducing wear and also thereby completely eliminating torque surges and noticeable shift points. The hydraulic power transmission means of the apparatus operates at a substantially constant pressure and eliminates any torque multiplication thereby enabling considerably smaller, more efficient, and less expensive construction of the hydrostatic elements while also increasing the bearing life of the elements.

In addition, the invention incorporates a means for reducing the motoring losses of the hydrostatic elements when the apparatus is operated continuously at about a 1:1 ratio where friction clutches are employed by declutching a portion of the hydrostatic power transmission from the output means. Furthermore, a modified form of the invention is provided wherein automatic self-synchronization is obtained between certain of the elements in the mechanical power path to eliminate the necessity of providing certain clutches or synchronizing devices.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An infinitely variable power transmission comprising an input means, a first intermediate driving connection, a second intermediate driving connection, and an output means, said first and second intermediate driving connections each being drivingly connected to said input means by first and second planetary gearing each including a plurality of members, a hydrostatic power transmission means including a first portion drivingly connected to one member of the first planetary gearing and a second portion drivingly connected to one member of the second planetary gearing, each of said portions including cylinders having pistons disposed therein, means providing fluid communication between said portions and a swash plate means operatively associated with each of said portions for controlling the movement of the pistons therein, each of said intermediate driving connections being selectively connectable to said output means by at least one selectively engageable and disengageable clutch means, and a control system, said control system including actuator means connected with said swash plate means for controlling the angular position of said swash plate means, said actuator means being movable to various positions to cause the swash plate means to be adjusted such that all of the drive from the input means to said output means passes through one or the other of said intermediate driving connections or partially through both of said intermediate driving connections, said control system including valve means for causing actuation of said clutch means, and cam means connected for movement with said actuator means and controlling said valve means such that the clutch means associated with either intermediate driving connection is actuated only when the swash plate associated with the intermediate driving connection is in such a position as to transmit no drive between the input means and the associated intermediate driving connection, whereby each clutch means is only engaged under no-load conditions from the input shaft so as to minimize wear on the clutch means.

2. An infinitely variable power transmission comprising an input means, first and second intermediate driving connections providing parallel power paths, each of said driving connections including at least a pair of drive transmitting members, a first planetary gearing, each of said drive transmitting members of the first intermediate driving connection being drivingly coupled to said input means through said first planetary gearing, a second planetary gearing, each of said drive transmitting members of said second intermediate driving connection being drivingly coupled to said input means through said second planetary gearing, each of said planetary gearings including a reaction member and being so constructed and arranged as to drive the associated drive transmitting members at relatively variable speeds with respect to one another, a common hydraulic power transmission, said reaction member of each of said planetary gearings being connected to said common hydraulic power transmission, said reaction members being connected to different portions of said hydraulic power transmission means and being independently rotatable with respect to one another, means for adjusting said hydraulic power transmission means for adjusting the amount of power transmitted between the gearing members interconnected by the hydraulic power transmission means, output means, and selectively engageable means for drivingly interconnecting each of said drive transmitting members with said output means and being shiftable into driving engagement when said drive transmitting members are substantially synchronized in speed with one another, thereby eliminating the necessity of providing auxiliary synchronizing means.

3. An infinitely variable power transmission comprising an input means, first and second intermediate driving connections providing parallel power paths, each of said driving connections including at least a pair of drive transmitting members, a first planetary gearing drivingly connected to said input means and a second planetary gearing drivingly connected to said input means, one member of said first planetary gearing being connected with a first drive transmitting member of said first intermediate driving connection, another member of said first planetary gearing being connected with another drive transmitting member of said first intermediate drive connection, a first member of said second planetary gearing being connected with a first drive transmitting member of said second intermediate driving connection, a second member of said second planetary gearing being connected with another drive transmitting member of said second intermediate driving connection, each of said planetary gearings being so constructed and arranged as to drive the associated drive transmitting members at relatively variable speeds with respect to one another, each of said planetary gearings including a reaction means, a common hydraulic power transmission means including a pair of hydraulic elements, one of said reaction means being connected to only one of said hydraulic elements for rotation therewith, another of said reaction means being connected to only another of said hydraulic elements for rotation therewith, means for adjusting said hydraulic power transmission means for adjusting the amount of power transmitted between said reaction means, output means, and selectively engageable means for drivingly interconnecting each of said drive transmitting members with said output means and being shiftable into driving engagement when said drive transmitting members are substantially synchronized in speed with one another.

4. An infinitely variable power transmission comprising an input means, a pair of separate intermediate driving connections mounted for rotation relative to one another, said intermediate driving connections being drivingly interconnected with said input means by an infinitely variable driving connection including gearing and a hydraulic power transmission means, said gearing being drivingly connected with said intermediate driving connections and including a driving means, a driven means and a plurality of reaction means, said hydraulic power transmission means including a pair of hydraulic elements which are hydraulically connected to transmit power to one another, means for varying the displacement of at least one hydraulic element to vary the amount of power transmitted between said hydraulic elements, one of said reaction means being mechanically interconnected with one of said hydraulic elements, another of said reaction means being mechanically interconnected with another of said hydraulic elements, an output means, and means for drivingly connecting said output means with each of said intermediate driving connections.

5. An infinitely variable power transmission comprising an input means, a pair of separate intermediate driving connections mounted for rotation relative to one another, said intermediate driving connections being drivingly interconnected with said input means by an infinitely variable driving connection including a pair of gearings and a hydraulic power transmission means, each gearing being drivingly connected with one of the intermediate driving connections and including a driving means, a driven means and a reaction means, said hydraulic power transmission means including a pair of hydraulic elements which are hydraulically connected to transmit power to one another, means for varying the displacement of at least one hydraulic element to vary the amount of power transmitted between said hydraulic elements, the reaction means of one of said gearings being mechanically interconnected with one of said hydraulic elements, the reaction means of the other of said gearings being mechanically interconnected with one another of said hydraulic elements, an output means, and means drivingly connecting said output means with each of said intermediate driving connections.

6. Apparatus as defined in claim 5, wherein the driving interconnection between at least one of said intermediate driving connections and said output means includes selectively engageable and disengageable means.

7. An infinitely variable power transmission comprising an input means, a pair of separate intermediate driving connections mounted for rotation relative to one another, said intermediate driving connections being drivingly interconnected with said input means by an infinitely variable driving connection including a pair of gearings and a hydraulic power transmission means, each gearing being drivingly connected with one of said intermediate driving connections and including a driving means, a driven means and a reaction means, said hydraulic power transmission means including a pair of hydraulic elements which are hydraulically connected to transmit power to one another, means for varying the displacement of at least one hydraulic element to vary the amount of power transmitted between said hydraulic elements, the reaction means of one of said gearings being mechanically interconnected with one of said hydraulic elements, the reaction means of the other of said gearings being mechanically interconnected with another of said hydraulic elements, an output means, means drivingly connecting said output means with each of said intermediate driving connections, and means for controlling said hydraulic power transmission means to provide infinitely variable driving ratios over a predetermined range.

8. An infinitely variable power transmission comprising an input means, a pair of intermediate driving connections, said intermediate driving connections being drivingly interconnected with said input means by an infinitely variable driving connection including a pair of gearings and a hydraulic power transmission means, each gearing being drivingly connected with one of said intermediate driving connections and including a driving means, a driven means and a reaction means, said hydraulic power transmission means including a pair of hydraulic elements which are hydraulically connected with one another, the reaction means of one of said gearings being mechanically interconnected with one of said hydraulic elements, the reaction means of the other of said gearings being mechanically interconnected with another of said hydraulic elements, an output means, gear means connected to each of said intermediate driving connections, intermeshing gear means associated with said output means for providing different gear ratios between said intermediate driving connections and said output means, and selectively engageable means for operatively connecting said intermediate driving connections with said output means at different gear ratios.

9. An infinitely variable power transmission comprising an input means, a pair of intermediate driving connections, said intermediate driving connections being drivingly interconnected with said input means by an infinitely variable driving connection including a pair of gearings and a hydraulic power transmission means, each gearing being drivingly connected with one of said intermediate driving connections and including a driving means, a driven means and a reaction means, said hydraulic power transmission means including a pair of hydraulic elements which are hydraulically connected with one another, the reaction means of one of said gearings being mechanically interconnected with one of said hydraulic elements, the reaction means of the other of said gearings being mechanically interconnected with another of said hydraulic elements, an output means, selectively operable means drivingly connecting said output means with each of said intermediate driving connections, and means for controlling said hydraulic power transmission means to provide infinitely variable driving ratios over a predetermined range, said control means including actuator means for controlling said hydraulic power transmission means to thereby adjust the amount of power transmitted from said input means to said intermediate driving connections, valve means for controlling actuation of said selectively engageable means, means operatively connected with said actuator means for controlling the movement of said valve means whereby the adjustment of said hydraulic power transmission means and the actuation of said selectively engageable means is interrelated to cause the selectively engageable means to shift under-no-load conditions, said control means including governor means connected with said input means and responsive to the speed of rotation of said input means, said governor means being operatively connected with said actuator means for controlling the movement of said actuator means thereby causing the hydraulic power transmission means and the selectively engageable means to be actuated in accordance with the speed of the input means.

10. An infinitely variable power transmission comprising an input means, a pair of separate intermediate driving connections mounted for rotation relative to one another, said intermediate driving connections being drivingly interconnected with said input means by an infinitely variable driving connection including a pair of gearings and a hydraulic power transmission means, each gearing being drivingly connected with one of said intermediate driving connections and including a driving means, a driven means and a reaction means, said hydraulic power transmission means including a pair of hydraulic elements which are hydraulically connected to transmit power to one another, means for varying the displacement of at least one hydraulic element to vary the amount of power transmitted between said hydraulic elements, the reaction means of one of said gearings being mechanically interconnected with one of said hydraulic elements, the reaction means of the other of said gearings being mechanically interconnected with another of said hydraulic elements, an output means, means drivingly connecting said output means with each of said intermediate driving connections, each of said portions including cylinders having pistons disposed therein, a swash plate means operatively associated with each of said portions for controlling the movement of the pistons therein, and a control system, said control system including actuator means connected with said swash plate means for controlling the angular position of said swash plate means.

11. An infinitely variable power transmission comprising an input means, a pair of intermediate driving connections, said intermediate driving connections being drivingly interconnected with said input means by an infinitely variable driving connection including a pair of gearings and a hydraulic power transmission means, each gearing being drivingly connected with one of said intermediate driving connections and including a driving means, a driven means and a reaction means, said hydraulic power transmission means including a pair of hydraulic elements which are hydraulically connected with one another, the reaction means of one of said gearings being mechanically interconnected with one of said hydraulic elements, the reaction means of the other of said gearings being mechanically interconnected with another of said hydraulic elements, an output means, selectively operable means drivingly connecting said output means with each of said intermediate driving connections, and means for controlling said hydraulic power transmission means to provide infinitely variable driving ratios over a predetermined range, and control means for shifting said selectively engageable means for engaging and disengaging said selectively engageable means upon predetermined positioning of said control means such that said selectively engageable means are engaged and disengaged while not under load from said input means.

12. An infinitely variable power transmission comprising an input means, a pair of intermediate driving connections, said intermediate driving connections being drivingly interconnected with said input means by an infinitely variable driving connection including gearing and a hydraulic power transmission means, said gearing being drivingly connected with said intermediate driving connections and including a driving means, a driven means and a plurality of reaction means, said hydraulic power transmission means including a pair of hydraulic elements which are hydraulically connected with one another, one of said reaction means being mechanically interconnected with one of said hydraulic elements, another of said reaction means being mechanically interconnected with another of said hydraulic elements, an output means, and means for drivingly connecting said output means with each of said intermediate driving connections, the driving interconnection between at least one of said intermediate driving connections and said output means including a pair of gearings for driving the output means from said one intermediate driving connection at different ratios, and selectively engageable and disengageable means for engaging each of said gearings to operatively connect said one intermediate driving connection to said output means.

13. An infinitely variable power transmission comprising an input means, a pair of intermediate driving connections, said intermediate driving connections being drivingly interconnected with said input means by an infinitely variable driving connection including a pair of gearings, and a hydraulic power transmission means, each gearing being drivingly connected with one of said intermediate driving connections and including a driving means, a driven means and a reaction means, said hydraulic power transmission means including a pair of hydraulic elements which are hydraulically connected with one another, the reaction means of one of said gearings being mechanically interconnected with one of said hydraulic elements, the reaction means of the other of said gearings being mechanically interconnected with another of said hydraulic elements, an output means, and means drivingly connecting said output means with each of said intermediate driving connections, the driving interconnection between at least one of said intermediate driving connections and said output means including a pair of gearings for driving the output means from said one intermediate driving connection at different ratios, and selectively engageable and disengageable means for engaging each of said gearings to operatively connect said one intermediate driving connection to said output means.

14. An infinitely variable power transmission comprising an input means, a pair of separate intermediate driving connections mounted for rotation relative to one another, said intermediate driving connections being drivingly interconnected with said input means by an infinitely variable driving connection including gearing and a hydraulic power transmission means, said gearing being drivingly connected with said intermediate driving connections and including a driving means, a driven means and a plurality of reaction means, said hydraulic power transmission means including a pair of hydraulic elements which are hydraulically connected to transmit power to one another, means for varying the displacement of at least one hydraulic element to vary the amount of power transmitted between said hydraulic elements, means for mechanically connecting one of said reaction means with one of said hydraulic elements, means for mechanically connecting another of said reaction means with another of said hydraulic elements, an output means, and means for drivingly connecting said output means with each of said intermediate driving connections, the driving interconnection between one of said intermediate driving connections and said output means comprising a selectively engageable means for connecting the output means directly to said one intermediate driving connection.

15. An infinitely variable power transmission comprising an input means, a pair of separate intermediate driving connections mounted for rotation relative to one another, said intermediate driving connections being drivingly interconnected with said input means by an infinitely variable driving connection including gearing and a hydraulic power transmission means, said gearing being drivingly connected with said intermediate driving connections and including a driving means, a driven means and a plurality of reaction means, said hydraulic power transmission means including a pair of hydraulic elements which are hydraulically connected to transmit power to one another, means for varying the displacement of at least one hydraulic element to vary the amount of power transmitted between said hydraulic elements, means for mechanically connecting one of said reaction means with one of said hydraulic elements, means for mechanically connecting another of said reaction means with another of said hydraulic elements, an output means, and means for drivingly connecting said output means with each of said intermediate driving connections, the driving interconnection between one of said intermediate driving connections and said output means including planetary gearing having a reaction means including selectively engageable means for establishing a drive between the output means and said intermediate driving connections at different drive ratios.

16. An infinitely variable power transmission comprising an input means, a pair of separate intermediate driving connections mounted for rotation relative to one another, said intermediate driving connections being drivingly interconnected with said input means by an infinitely variable driving connection including gearing and a hydraulic power transmission means, said gearing being drivingly connected with said intermediate driving connections and including a driving means, a driven means and a plurality of reaction means, said hydraulic power transmission means including a pair of hydraulic elements which are hydraulically connected to transmit power to one another, means for varying the displacement of at least one hydraulic element to vary the amount of power transmitted between said hydraulic elements, means for mechanically connecting one of said reaction means with one of said hydraulic elements, means for mechanically connecting another of said reaction means with another of said hydraulic elements, an output means, and means for drivingly connecting said output means with each of said intermediate driving connections, the driving interconnection between one of said intermediate driving connections and said output means including gearing having a sun gear, planetary gear means and reaction means including selectively engageable brake means for establishing a drive between the output means and one of said intermediate driving connections at different drive ratios.

17. An infinitely variable power transmission comprising an input means, a pair of separate intermediate driving connections mounted for rotation relative to one another, said intermediate driving connections being drivingly interconnected with said input means by an infinitely variable driving connection including gearing and a hydraulic power transmission means, said gearing being drivingly connected with said intermediate driving connections and including a driving means, a driven means and a plurality of reaction means, said hydraulic power transmission means including a pair of hydraulic elements which are hydraulically connected to transmit power to one another, means for varying the displacement of at least one hydraulic element to vary the amount of power transmitted between said hydraulic elements, one of said reaction means being mechanically interconnected with one of said hydraulic elements, another of said reaction means being mechanically interconnected with another of said hydraulic elements, an output means, and means for drivingly connecting said output means with each of said intermediate driving connections, the driving interconnection between one of said intermediate driving connections and said output means including gearing having a driving sun gear means, driven planetary gear means, and reaction gear means, said planetary gear means being mounted on a carrier means, said carrier means being drivingly interconnected with said one intermediate driving interconnection and also being drivingly interconnected with said output means, and selectively operable brake means associated with said last-mentioned reaction gear means for selectively holding said last-mentioned reaction gear means against rotation.

18. An infinitely variable power transmission comprising an input means, a pair of separate intermediate driving connections mounted for rotation relative to one another, said intermediate driving connections being drivingly interconnected with said input means by an infinitely variable driving connection including gearing and a hydraulic power transmission means, said gearing being drivingly connected with said intermediate driving connections and including a driving means, a driven means and a plurality of reaction means, said hydraulic power transmission means including a pair of hydraulic elements which are hydraulically connected to transmit power to one another, means for varying the displacement of at least one hydraulic element to vary the amount of power transmitted between said hydraulic elements, one of said reaction means being mechanically interconnected with one of said hydraulic elements, another of said reaction means being mechanically interconnected with another of said hydraulic elements, an output means, and means for drivingly connecting said output means with each of said intermediate driving connections, the driving interconnection between one of said intermediate driving connections and said output means comprising a selectively operable clutch means for connecting the output means to said one intermediate driving connection to provide a 1:1 drive ratio betwen said input means and said output means, the driving interconnection between the other of said intermediate driving connections and said output means including carrier means drivingly interconnected with said other intermediate driving connection and also being drivingly interconnected with said output means, planetary gear means mounted on said carrier means, sun gear means drivingly interconnected with said one intermediate driving connection and engaging said last-mentioned planet gear means, and reaction gear means operatively engaging said planet gear means, and selectively operable brake means associated with said reaction gear means for selectively holding said reaction gear means against rotation.

References Cited by the Examiner

UNITED STATES PATENTS

| | | | |
|---|---|---|---|
| 2,808,737 | 10/57 | Bullard | 74—687 |
| 2,817,250 | 12/57 | Forster | 74—687 |
| 2,914,965 | 12/59 | Matz | 74—687 |
| 2,917,948 | 12/59 | Nussbaumer | 74—687 |
| 2,939,342 | 6/60 | Woydt et al. | 74—687 |
| 2,962,915 | 12/60 | Wiggerman | 74—687 |
| 2,972,905 | 2/61 | Bullard | 74—687 |
| 3,023,638 | 3/62 | Westbury et al. | 74—687 |

DON A. WAITE, *Primary Examiner.*